United States Patent
Ito

(10) Patent No.: US 8,135,875 B2
(45) Date of Patent: Mar. 13, 2012

(54) IMAGE FORMATION APPARATUS CAPABLE OF PREVENTING ACCESS TO IMPROPER USB MEMORY, AND CONTROL METHOD FOR IMAGE FORMATION APPARATUS

(75) Inventor: Hiroyasu Ito, Okazaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 478 days.

(21) Appl. No.: 12/131,658

(22) Filed: Jun. 2, 2008

(65) Prior Publication Data

US 2009/0019191 A1    Jan. 15, 2009

(30) Foreign Application Priority Data

Jul. 13, 2007   (JP) .................................. 2007-184750

(51) Int. Cl.
*G06F 3/00*    (2006.01)
(52) U.S. Cl. ............................ 710/15; 358/1.14; 358/404
(58) Field of Classification Search .................... 710/8
See application file for complete search history.

(56) References Cited

U.S. PATENT DOCUMENTS

| | | | |
|---|---|---|---|
| 7,131,595 B2 * | 11/2006 | Wurzburg | 235/492 |
| 7,724,390 B2 * | 5/2010 | Imai | 358/1.18 |
| 2002/0044295 A1 * | 4/2002 | Tanaka | 358/1.13 |
| 2004/0049556 A1 | 3/2004 | Watanabe | |
| 2004/0212735 A1 * | 10/2004 | Kitamura | 348/553 |
| 2005/0023339 A1 * | 2/2005 | Uno | 235/375 |
| 2005/0036397 A1 * | 2/2005 | Yeh et al. | 365/232 |
| 2005/0134704 A1 * | 6/2005 | Uryu et al. | 348/231.7 |

FOREIGN PATENT DOCUMENTS

| | | |
|---|---|---|
| JP | 2003-163786 | 6/2003 |
| JP | 2005-017855 | 1/2005 |
| JP | 2005-102034 | 4/2005 |
| JP | 2005-131825 A | 5/2005 |
| JP | 2006-108867 | 4/2006 |
| JP | 2007-053792 | 3/2007 |

OTHER PUBLICATIONS

Hewlett-Pacakrd Company, "hp photosamrt 1000" user's guide; 2000; pp. 21-26 and 87-90.*
Hewlett-Packard Comapny, "hp psc 2500 photosmart series all-in-one" reference guide; 2003; pp. 21-34.*
Notice of Grounds of Rejection in JP 2007-184750 dated Aug. 25, 2009, and an English Translation thereof.

* cited by examiner

*Primary Examiner* — Elias Mamo
(74) *Attorney, Agent, or Firm* — Buchanan Ingersoll & Rooney PC

(57) ABSTRACT

Determination is made whether acceptance of a job on a USB memory is permitted or not. When in a USB memory job acceptance permitted state, a USB memory job selection display process is executed. When in a USB memory job acceptance prohibited state, a USB memory plural load prohibition display process is executed. When in a USB memory job acceptance prohibited state, the relevant display screen is continuously provided. Therefore, the user is provided with the relevant display screen to be prompted confirmation of the loading of a USB memory.

15 Claims, 19 Drawing Sheets

USB MEMORY JOB SELECTION DISPLAY SCREEN

USB MEMORY PLURAL LOAD PROHIBITION DISPLAY SCREEN

SCAN MODE SELECTION SCREEN

CURRENTLY SCANNING SCREEN

USB MEMORY REWRITE SELECTION SCREEN

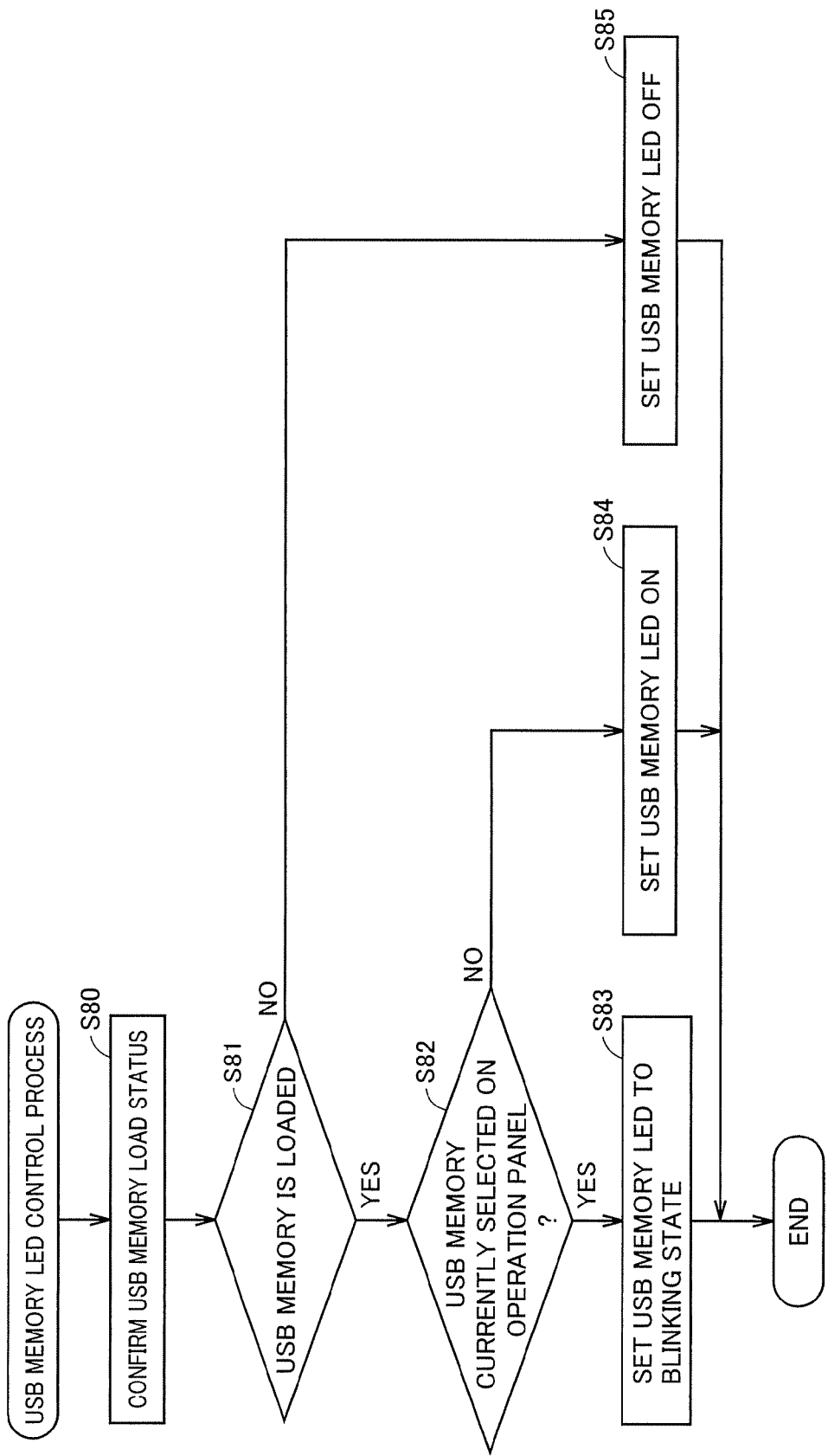

IMAGE FORMATION APPARATUS CAPABLE OF PREVENTING ACCESS TO IMPROPER USB MEMORY, AND CONTROL METHOD FOR IMAGE FORMATION APPARATUS

This application is based on Japanese Patent Application No. 2007-184750 filed with the Japan Patent Office on Jul. 13, 2007, the entire content of which is hereby incorporated by reference.

BACKGROUND OF THE INVENTION

1. Field of the Invention

The present invention relates to an image formation apparatus, particularly an image formation apparatus including a USB (Universal Serial Bus) connecter that allows loading of a USB memory, and a control method for such an image formation apparatus.

2. Description of the Related Art

Reflecting the common use of USB memories, there are now many users carrying around a USB memory in which document data is stored.

In view of such cases, there are more MFPs (Multi Function Peripheral), which is an example of an image formation apparatus, incorporating the feature of the so-called USB memory printing to print out the document stored in a USB memory at the MFP and USB memory scanning (hereinafter referred to as ScanToUSB memory) to have the contents of a paper medium converted into electronic form and stored in a USB memory loaded at a USB connecter.

With the increasing scale of the multifunction of the MFP, the trend is to extend the function by connecting an external device to a USB connecter.

Examples of external devices include USB keyboards, USB-IC card readers, USB fingerprint verification devices, USB mouse, and the like. It is now common to have a plurality of USB connectors mounted on an MFP for such function extension.

In this context, there may be the case where a plurality of USB memories are loaded to the plurality of USB connectors of an MFP.

Consider the case where a user executing USB memory printing takes away only the paper print medium and leaves the MFP with his/her own USB memory loaded at the MFP. In this state of affairs, the next user to execute a ScanToUSB memory procedure may set another USB memory at a USB connector, resulting in the case where a plurality of USB memories are loaded to the plurality of USB connectors at the MFP.

Another expected case is when a user executing a ScanToUSB memory procedure converts the image data of a large amount of documents, subsequent to the scanning operation, into another format such as PDF (Portable Document Format) and leaves the MFP during execution of writing the image data into a USB memory. This is a likely event since the process of converting and writing image data of a large amount of documents is time consuming.

In this state of affairs, the next user to execute a ScanToUSB memory procedure may set another USB memory at a USB connector, resulting in the case where a plurality of USB memories are loaded to the plurality of USB connectors at the MFP.

There is a possibility of the NIP not being able to determine which USB memory is to be accessed during a job. Data may be read out or written into an improper USB memory unless appropriate measures are taken.

Japanese Laid-Open Patent Publication No. 2005-131825 discloses a scheme of preventing transfer of improper data among a plurality of input ports by assigning priority to the input ports. The port with the higher number of times of image data input is taken as the port of priority.

In the case where the scheme disclosed in the aforementioned publication is employed, the port corresponding to the higher count of loading image data from a USB memory will be accessed among the plurality of ports to which relevant USB memories are loaded. When a USB memory is attached to the port with the higher count of loading and a command is issued to execute printing from another USB memory attached to another port, the image data from the USB memory already attached will be loaded and printed out. Thus, there is a possibility of not being able to execute printing as intended by the user.

This event is also disadvantageous in that the printed out image data may be unintentionally exposed to the next user designating printout, which is not desirable from the sake of security if the print out corresponds to confidential information.

An MFP is generally configured with an operation display disposed at the front side of the MFP and the board panel for control of the machine disposed at the rear side.

The USB connector is often arranged at the rear side of the MFP for the purpose of reducing the wiring path with respect to the board panel. A view of the USB connector is not readily available to the user since the rear side of the MFP is distant from the operation display. The user may not realize that a plurality of USB memories are loaded. The possibility of the above-described problem occurring is high.

SUMMARY OF THE INVENTION

In view of the foregoing, an object of the present invention is to provide an image formation apparatus capable of preventing access to an improper USB memory in the case where a plurality of USB memories are loaded at a plurality of USB connectors, and a control method for such an image formation apparatus.

An image formation apparatus of the present invention includes a plurality of connectors allowing loading of a plurality of detachable storage devices, a document reader reading a document, and a detector detecting connection status between a connector and a detachable storage device. When connection of a plurality of detachable storage devices at a plurality of connectors is detected, operation of the reader is prohibited.

Another image formation apparatus according to the present invention includes a plurality of connectors allowing loading of a plurality of detachable storage devices, a writer writing electronic data into a detachable storage device when the detachable storage device is connected at a connector, and a detector detecting connection status between a connector and a detachable storage device. When connection of a plurality of detachable storage devices at a plurality of connectors is detected, a writing operation of electronic data into a detachable storage device is prohibited.

A further image formation apparatus of the present invention includes a plurality of connectors allowing loading of plurality of detachable storage devices, a reader reading electronic data stored in a detachable storage device out from the detachable storage device when the detachable storage device is connected at a connector, a printer printing out the read image data, and a detector detecting connection status between a connector and a detachable storage device. When connection of a plurality of detachable storage devices at a plurality of connectors is detected, the printing operation of electronic data is prohibited.

Preferably, each connector includes a lighting turned on in response to designation. The image formation apparatus further includes an operation unit having an operation screen, and a lighting control unit for control of the lighting. When a plurality of detachable storage devices are connected at a plurality of connectors, a selection screen prompting selection of any one of the plurality of detachable storage devices is displayed on the operation screen. When selection of any one of the plurality of detachable storage devices is executed at the selection screen of the operation screen, the lighting control unit sets the lighting of the corresponding detachable storage device in a blinking manner.

When any one of the plurality of detachable storage devices is selected at the selection screen on the operation screen, the selected detachable storage device is identified and access to the identified detachable storage device is executed.

Preferably, the image formation apparatus further includes an operation unit having an operation screen. On the operation screen are displayed a model representing an appearance of the plurality of connectors, and a selection screen prompting selection of any one of the plurality of detachable storage devices.

Preferably, the image formation apparatus further includes an operation unit having an operation screen. On the operation screen are displayed lists of document files stored in the plurality of the detachable storage devices, and a selection screen prompting selection of any one of the plurality of the detachable storage devices.

Preferably, the image formation apparatus further includes an operation unit having an operation screen. When connection of a new detachable storage device is detected during access of one detachable storage device, a display process of prompting unloading of the new detachable storage device is executed on the operation screen.

Preferably, the image formation apparatus is provided with an operation unit having an operation screen at a front side of the image formation apparatus. A control board for control of the image formation apparatus is provided at a rear side, opposite to the front side of the image formation apparatus. The plurality of connectors are provided in proximity to the control board provided at the rear side.

A control method for an image formation apparatus of the present invention including a plurality of connectors allowing loading of a plurality of detachable storage devices, and a document reader reading a document, includes the steps of: detecting connection status between a connector and a detachable storage device, and prohibiting an operation of the document reader when connection of a plurality of detachable storage devices at a plurality of connectors is detected at the detecting step.

Another control method for an image formation apparatus of the present invention including a plurality of connectors allowing loading of a plurality of detachable storage devices, and a writer writing electronic data into a detachable storage device when the detachable storage device is connected at a connector, includes the steps of: detecting connection status between a connector and a detachable storage device, and prohibiting a writing operation of electronic data into a detachable storage device when connection of a plurality of detachable storage devices at a plurality of connectors is detected at the detecting step.

A further control method for an image formation apparatus of the present invention including a plurality of connectors allowing loading of plurality of detachable storage devices, a reader reading electronic data stored in a detachable storage device out from the detachable storage device when the detachable storage device is connected at a connector, and a printer printing out the read image data, includes the steps of: detecting connection status between a connector and a detachable storage device, and prohibiting a printing operation of electronic data when connection of a plurality of detachable storage devices at a plurality of connectors is detected at the detecting step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 22 is a flowchart to describe a process of a USB memory LED control unit according to the modification of the third embodiment of the present invention.

DESCRIPTION OF THE PREFERRED EMBODIMENTS

Figure 1:
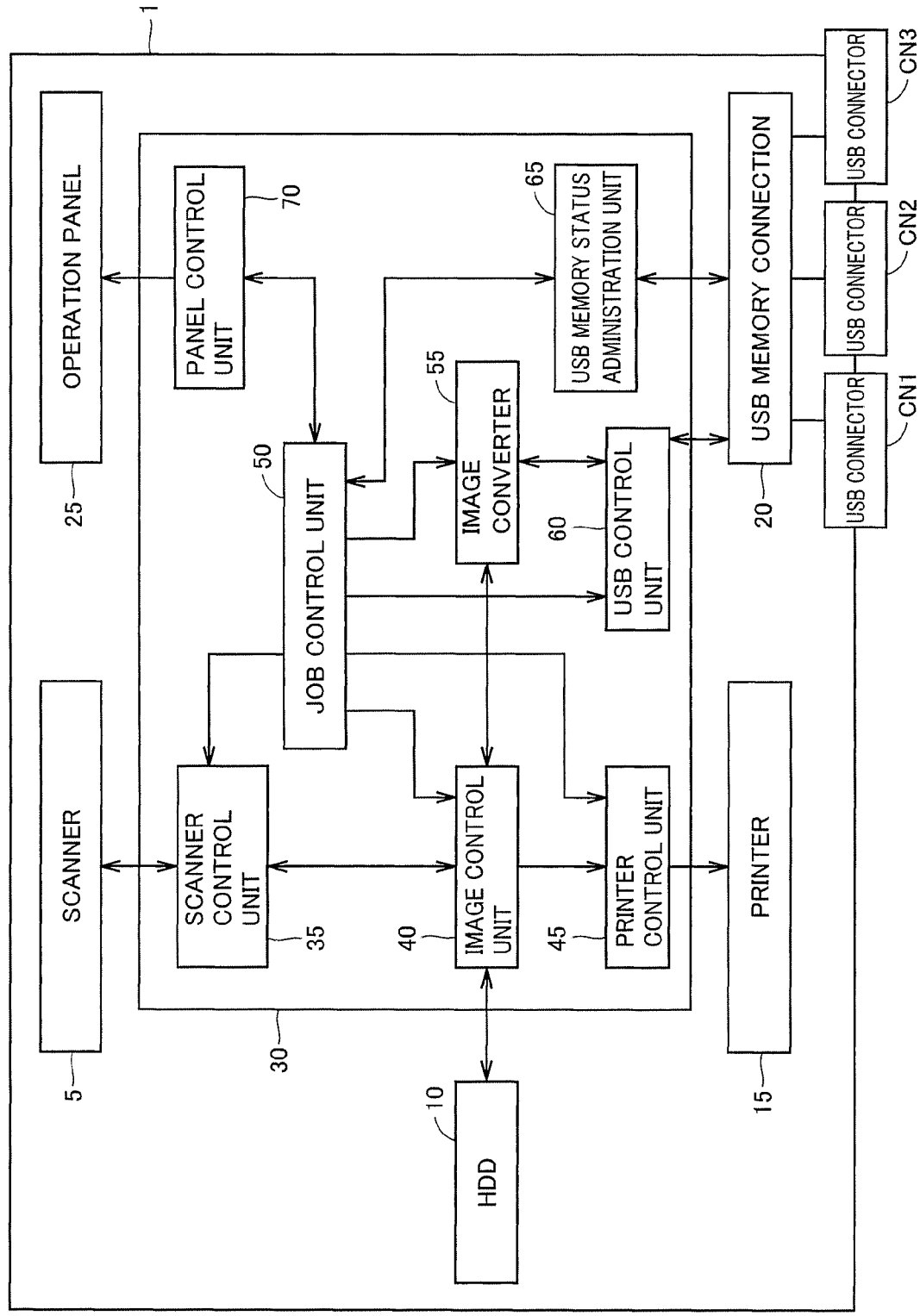
FIG. 1 is a schematic block diagram of an MFP qualified as an image formation apparatus according to a first embodiment of the present invention.

Embodiments of the present invention will be described hereinafter with reference to the drawings. The same or corresponding components and elements have the same reference characters allotted, and their designation and function are also the same.

First Embodiment

Referring to FIG. 1, an MFP 1 qualified as an image formation apparatus of a first embodiment of the present invention includes a scanner 5 converting material of a paper medium or the like into electronic data, a hard disk drive (HDD) 10, a printer 15 to execute a printing process, USB connectors CN1-CN3 to load respective USB memories, a USB memory connection 20 executing connection control between USB connectors CN1-CN3 and a USB memory, an operation panel 25 including an operation display, and a controller 30 providing overall control of the MFP.

USB memory connection 20 detects loading of a USB memory at USB connectors CN1-CN3 to output a detection signal to USB memory status administration unit 65.

Controller 30 includes a job control unit 50 for control of a job of MFP 1, a scanner control unit 35 for control of scanner 5 in response to a command from job control unit 50, an image control unit 40 for execution of image processing, a printer control unit 45 for control of printer 15, a USB control unit 60 executing access to a USB memory via USB memory connection 20, a USB memory status administration unit 65 for administration of load status of a USB memory, an image converter 55 converting the format of image data, and a panel control unit 70 displaying and designating the display contents required for operation by the user on operation panel 25 and providing the designation in response to the operation input from operation panel 25 to job control unit 50.

Image control unit 40 receives image data corresponding to the electronic data scanned at scanner 5 via scanner control unit 35 or the image data from image converter 55 to execute, in response to designation from job control unit 50 subsequent to image processing, a writing process into HDD 10, or an output to printer control unit 45 or to image converter 55.

Printer control unit 45 receives the image data input from image control unit 40 to designate printing to printer 15. Printer 15 executes a printing process of the image data designated for printing by printer control unit 45.

Image converter 55 responds to designation from job control unit 50 to convert image data from image control unit 40 into a predetermined format for output to USB control unit 60, or to convert image data input from a USB memory via USB control unit 60 for output to image control unit 40.

USB control unit 60 responds to designation from job control unit 50 to output the image data converted in format from image converter 55 to a USB memory via a USB connector having the connection under control of USB memory connection 20 to execute a write process towards the relevant USB memory. USB control unit 60 responds to designation from job control unit 50 to execute a readout process of image data from a USB memory via a USB connector having the connection under control of USB memory connection 20.

USB memory status administration unit 65 receives a detection signal designating the loading status of a USB memory from USB memory connection 20 for administration of the loaded status of a USB memory. When determination is made that a plurality of USB memories are connected to at least two of USB connectors CN1-CN3, USB memory status administration unit 65 provides such information to job control unit 50.

Panel control unit 70 provides the contents to be displayed towards the operation display at operation panel unit 25 and provides designation in response to an operation input from operation panel unit 25 towards job control unit 50.

Job control unit 50 outputs an operation command to each control unit and the like to execute various functions (jobs) of MFP 1 according to the designation corresponding to the operation input from panel control unit 70.

The appearance of MFP 1 according to the first embodiment of the present invention will be described with reference to FIG. 2.

Figure 2:
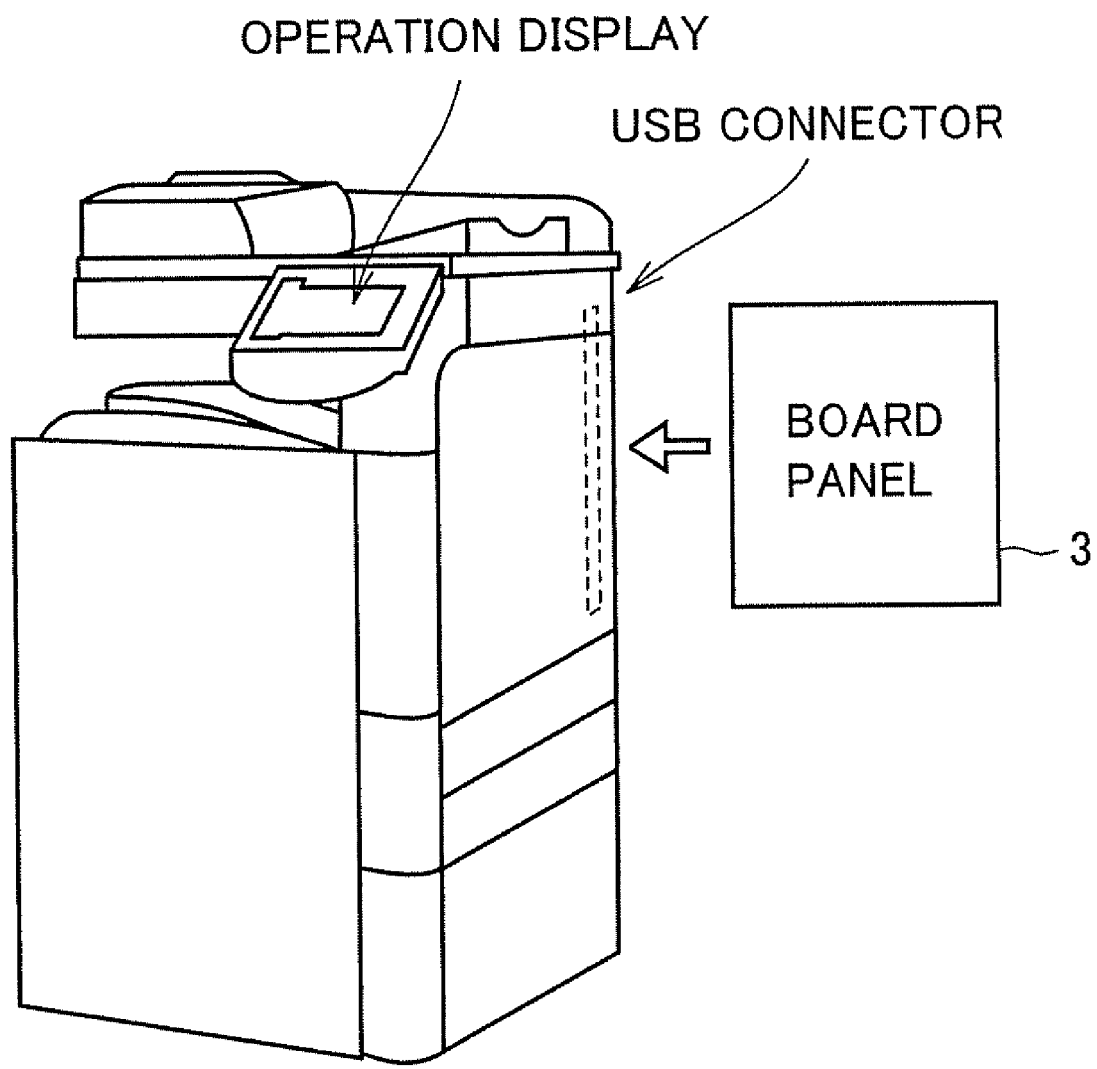
FIG. 2 is a schematic diagram of an appearance of the MFP of the first embodiment of the present invention.

Referring to FIG. 2, an operation display of operation panel 25 is indicated at the front side of MFP 1. The operation display is configured to allow manipulation input in touch panel form. Although not shown, it is assumed that a start key to designate execution, a ten-key for numeric input, and the like are provided on operation panel 25 in addition to the operation display.

In the configuration of FIG. 2, the operation panel of the operation display and the like is provided at the front side of MFP 1, whereas a board panel 3 on which controller 30 and the like are mounted is provided at the rear side of MFP 1, in a direction perpendicular to the ground. Although not shown, a USB connector is disposed at the rear side of MFP 1, in proximity to board panel 3 in order to reduce the wiring path to board panel 3.

A process of administration of the loading status of a USB memory carried out at USB memory status administration unit 65 according to the first embodiment will be described with reference to FIG. 3.

Figure 3:
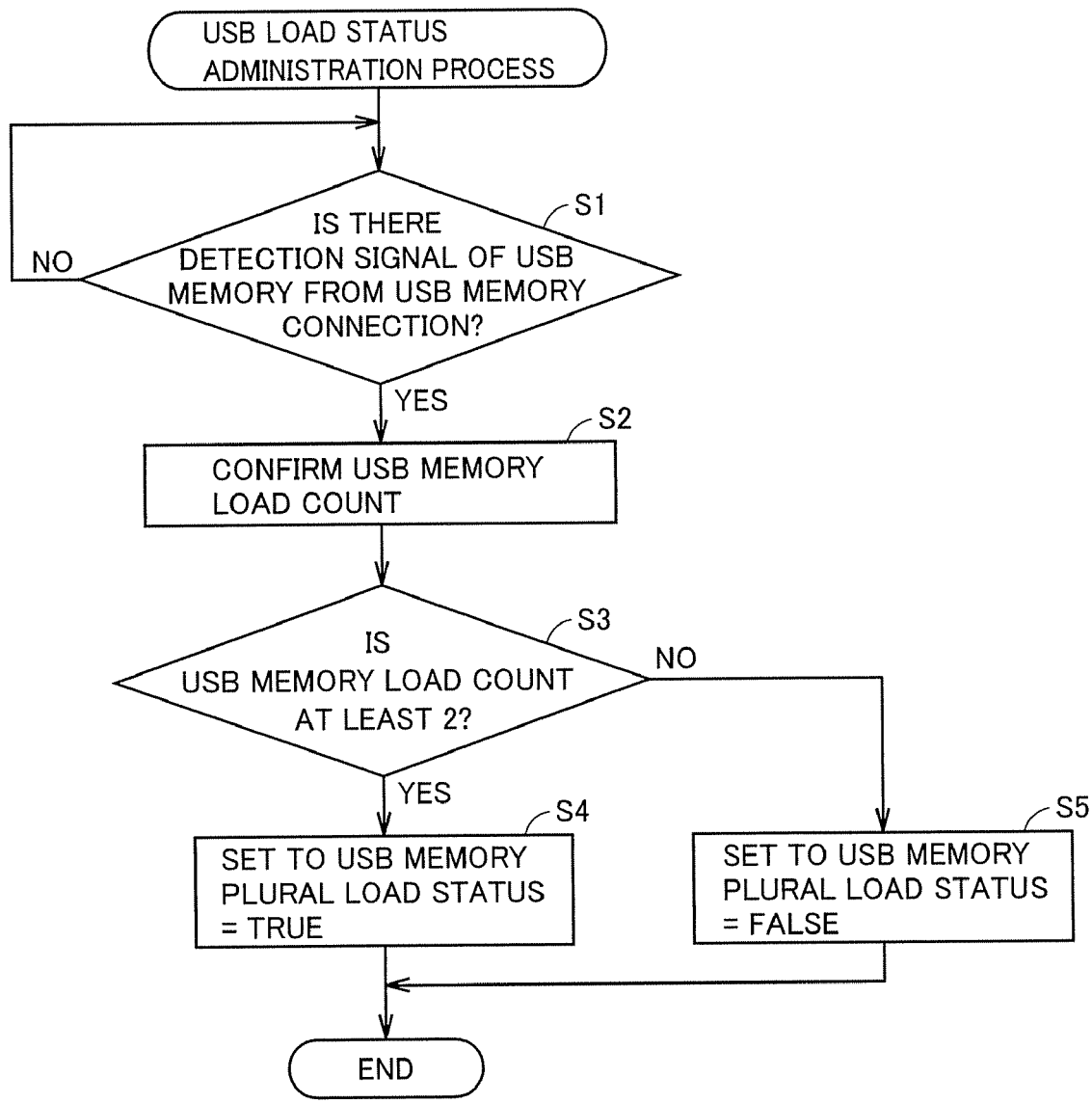
FIG. 3 is a flowchart to describe a process of administration of loading status of a USB memory carried out at a USB memory status administration unit of the first embodiment of the present invention.

Referring to FIG. 3, determination is made whether there is a detection signal of a USB memory from USB memory connection 20 (step S1).

When a USB memory is attached to at least one of USB connectors CN1-CN3, USB memory connection 20 detects such connection and outputs the detection signal to USB memory status administration unit 65.

When determination is made that there is a detection signal of a USB memory from USB memory connection 20 at step S1, control proceeds to step S2 to confirm the number of loaded USB memories.

Then, determination is made as to whether at least two USB memories are loaded or not (step S3).

When determination is made that two or more USB memories are loaded at step S3, control proceeds to step S4 to set "True" for the USB memory plural load status stored in the memory region of USB memory status administration unit 65.

When determination is made that two or more USB memories are not loaded at step S3, the USB memory plural load status stored in the memory region in USB memory status administration unit 65 is set to "False". Then, the process ends.

The USB load status administration process is executed periodically at a predetermined timing.

A periodic monitor process carried out by job control unit 50 will be described hereinafter.

Figure 4:
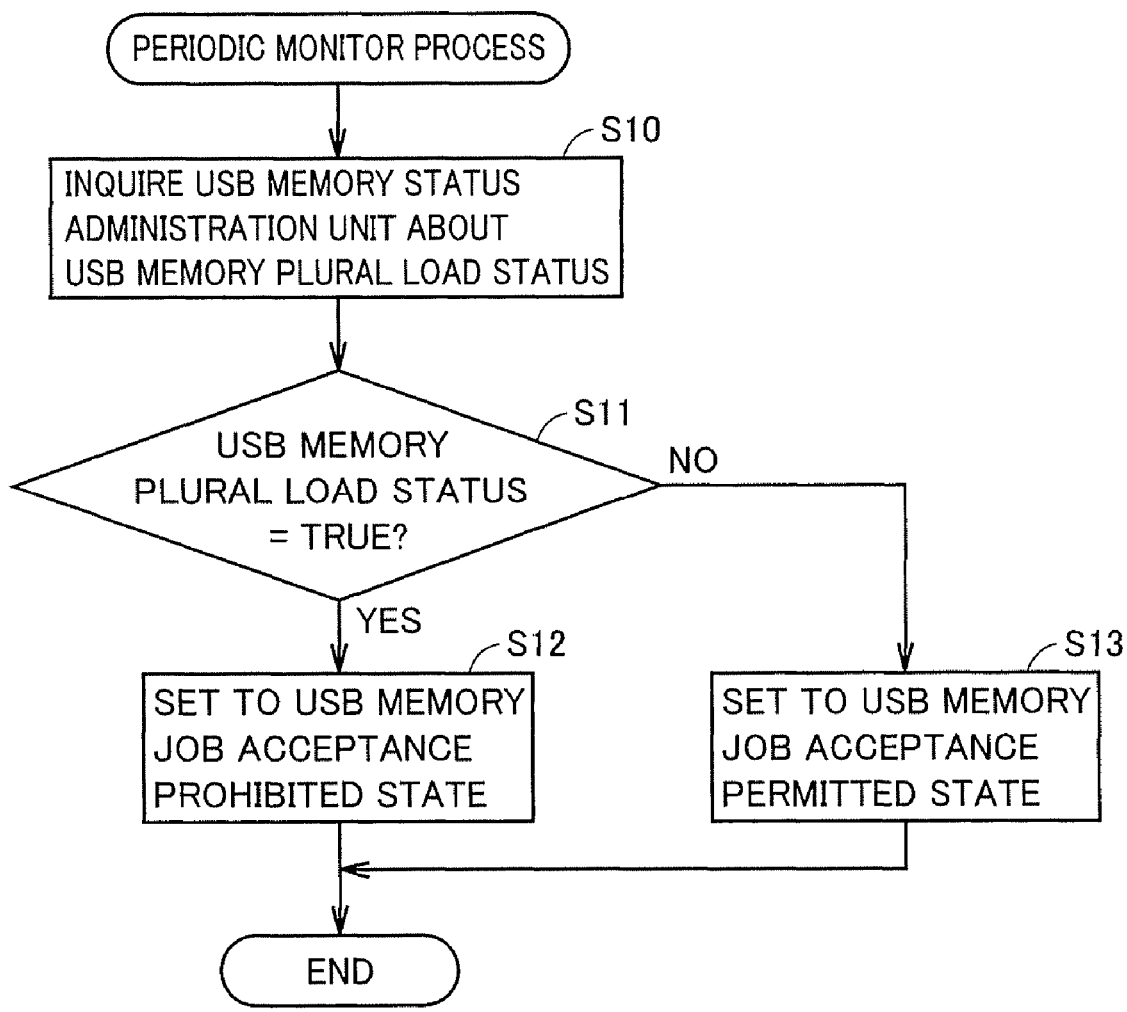
FIG. 4 is a flowchart to describe a process of monitoring loading status of a USB memory carried out at a job control unit according to the first embodiment of the present invention.

FIG. 4 is a flow chart to describe a process of monitoring the load status of a USB memory carried out by job control unit 50 according to the first embodiment of the present invention. It is assumed that the relevant monitor process is executed periodically at a predetermined timing.

First, an inquiry is made about USB memory plural load status to USB memory status administration unit 65 (step S10).

Then, determination is made whether the USB memory plural load status="True" is established (step S11).

When the USB memory plural load status is "True" at (step S11), control proceeds to step S12 to set the USB memory job acceptance state to a prohibited state (USB memory job acceptance prohibited state).

When the USB memory plural load status is not "True" at step S11, control proceeds to step S13 to set the USB memory job acceptance state to a permitted state (USB memory job acceptance permitted state). Then, the process ends.

An access process of a USB memory will be described hereinafter with reference to FIG. 5.

At step S20, determination is made whether acceptance of a job for a USB memory is permitted or not.

When determination is made that acceptance of a USB memory job is permitted (USB memory job acceptance permitted state) at step S20, control proceeds to step S22 to execute a job selection display process of a USB memory (USB memory job selection display process).

A job selection display screen of a USB memory (USB memory job selection display screen) according to the first embodiment of the present invention will be described with reference to FIG. 6.

Figure 6:
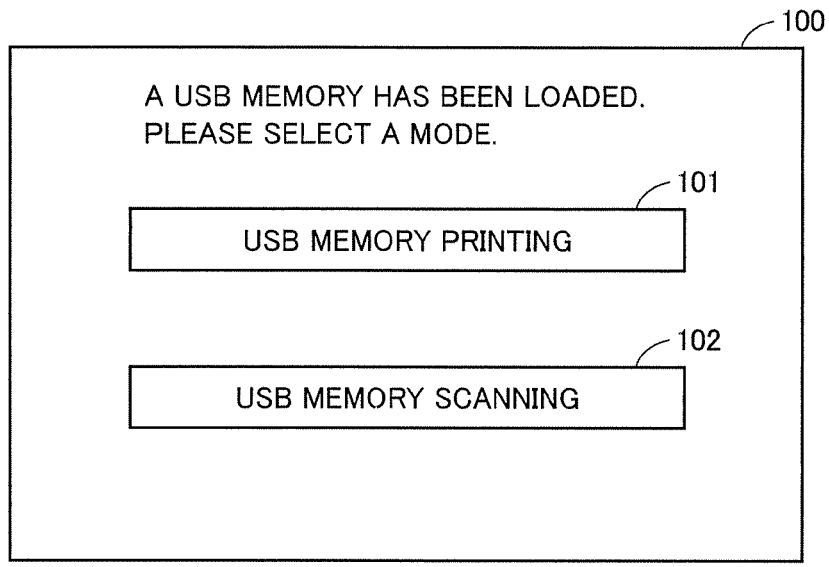
FIG. 6 is a diagram to describe a display screen of job selection of a USB memory according to the first embodiment of the present invention.

Referring to FIG. 6, the message of "A USB memory has been loaded. Please select a mode." as well as an operation button 101 to designate execution of USB memory printing and an operation button 102 to designate execution of USB memory scanning are provided on an operation display screen 100. The user can select an appropriate operation button 101/102 on operation display screen 100 to execute the selected function.

Referring to FIG. 5 again, in the case where acceptance of a USB memory job is not permitted, i.e. USB memory job acceptance is prohibited (USB memory job acceptance prohibited state), control proceeds to step S21.

At step S21, a display process indicating that loading of a plurality of USB memories is prohibited (USB memory plural loading prohibition display process) is executed.

Figure 7:
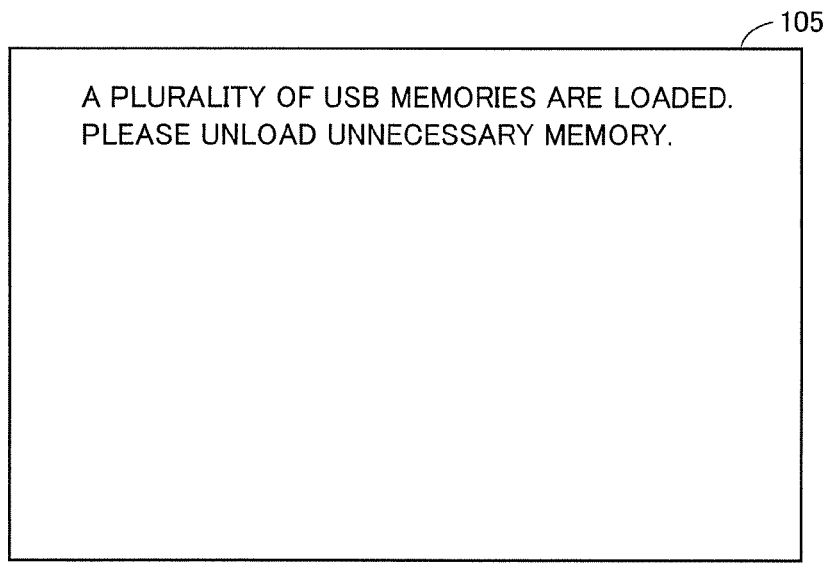
FIG. 7 is a diagram to describe a display screen indicating prohibition of loading a plurality of USB memories according to the first embodiment of the present invention.

A display screen indicating that loading of a plurality of USB memories is prohibited according to the first embodiment of the present invention (USB memory plural loading prohibition display screen) will be described with reference to FIG. 7.

The message of "A plurality of USB memories are loaded. "Please unload an unnecessary memory." is provided on operation display screen 105. Then, control returns to step S20.

When in a USB memory job acceptance prohibited state, this display screen will be provided continuously. The user can be warned by this display screen and is prompted to confirm loading of a USB memory. The user can set the loading to one USB memory, whereby the USB memory job acceptance prohibited state is rendered to a USB memory job acceptance permitted state to allow transition from step S20 to the display process of step S22 of FIG. 5 corresponding to a USB memory job selection display screen.

Figure 5:
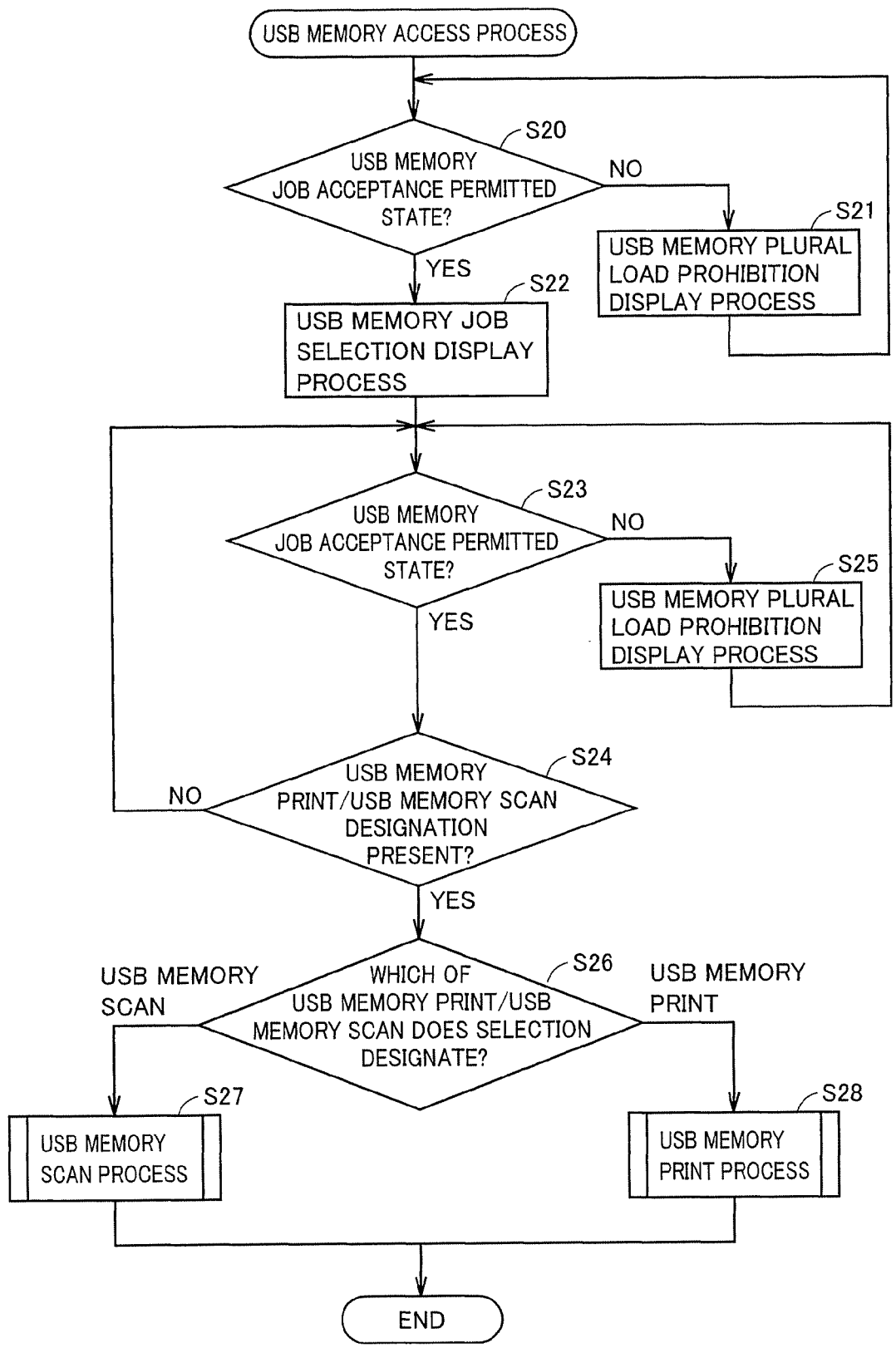
FIG. 5 is a flowchart to describe a USB memory access process according to the first embodiment of the present invention.

Following execution of a USB memory job selection display process (step S22) of FIG. 5, control proceeds to step S23 to determine whether USB memory job acceptance is permitted or not.

When in a USB memory job acceptance permitted state at step S23, control proceeds to step S24, otherwise, control proceeds to step S25.

At step S25, a USB memory plural loading prohibition display process, similar to that described at step S21 set forth above, is executed. Then, control returns to step S23.

The USB memory plural loading prohibition display process will be executed unless the USB memory plural loaded status is canceled, i.e. unless a USB memory job acceptance permitted state is achieved at step S23.

For example, when a USB memory job selection display process is executed under a USB memory job acceptance permitted state of step S20, and then a plurality of USB memories are loaded, a USB memory plural loading prohibition display screen will be displayed continuously since a USB memory plural loading prohibition display process is executed when in a USB memory job acceptance prohibited state. The user can be warned by this display screen and is prompted to confirm loading of a USB memory. The user can set the loading to one USB memory, whereby the USB memory job acceptance prohibited state is rendered to a USB memory job acceptance permitted state to allow transition from step S23 to step S24 of FIG. 5.

When in a USB memory job acceptance permitted state at step S23, control proceeds to step S24 to determine whether USB memory print/USB memory scan has been designated.

When determination is made that there is no USB memory print/USB memory scan designation at step S24, control returns to step S23.

When there is designation of one of USB memory print/USB memory scan at step S24, control proceeds to step S26 to determine whether the selection corresponds to USB memory printing or USB memory scanning.

When determination is made that USB memory scanning has been designated at step S26, control proceeds to step S27 to execute a USB memory scan process. Then, the process ends.

When determination is made that USB memory printing has been designated at step S26, control proceeds to step S28 to execute a USB memory print process. Then, the process ends.

A USB memory scan process according to the first embodiment of the present invention will be described with reference to FIG. 8.

Figure 8:
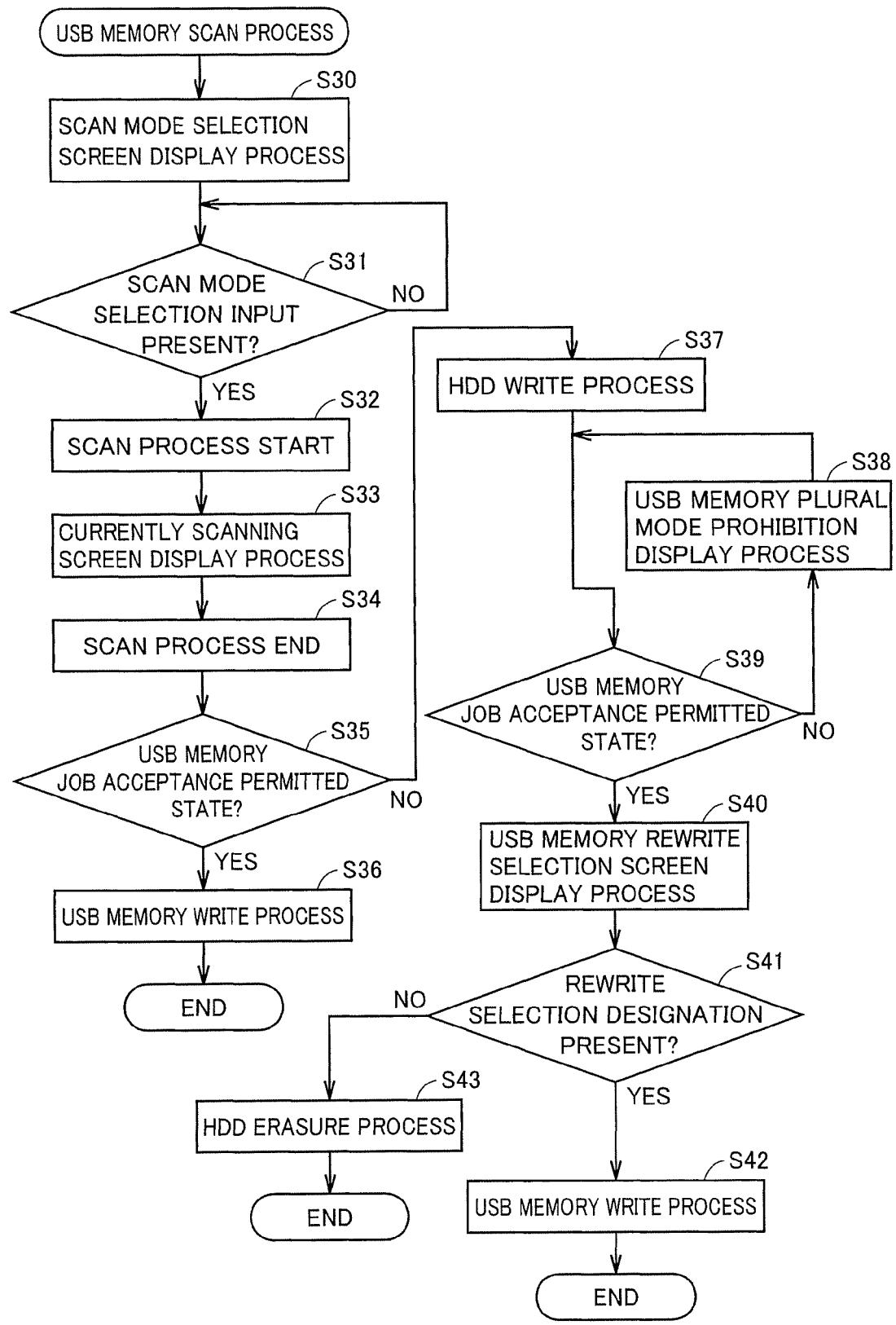
FIG. 8 is a flowchart to describe a USB memory scan process according to a first embodiment of the present invention.

Referring to FIG. 8, a display process of a scan mode selection screen (scan mode selection screen display process) is executed (step S30).

A scan mode selection screen according to the first embodiment of the present invention will be described with reference to FIG. 9.

Figure 9:
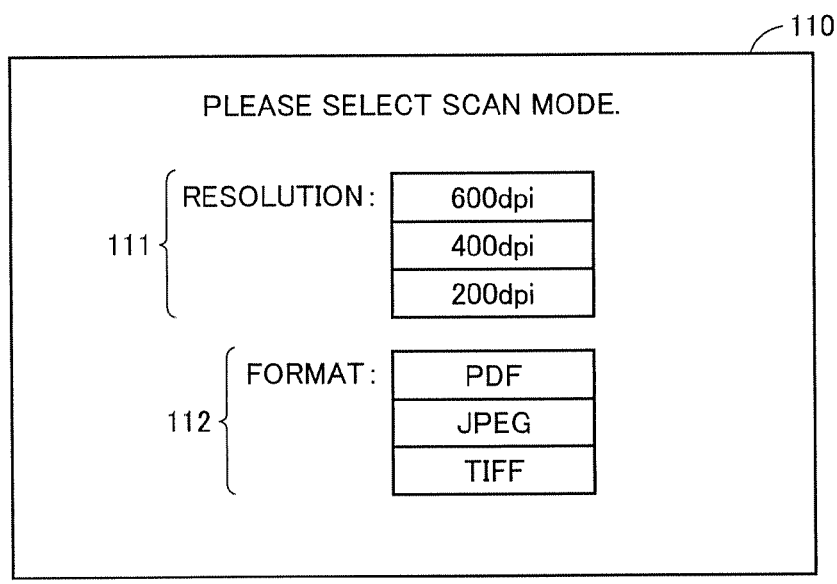
FIG. 9 is a diagram to describe a selection screen of a scan mode according to the first embodiment of the present invention.

Referring to FIG. 9, the message of "Please select scan mode." as well as a resolution selected display region 111 and a format select display region 112 are displayed on operation display screen 110.

At resolution display region 111, respective operation buttons are arranged to allow selection of 600 dpi, 400 dpi, and 200 dpi.

At format type select display region 112, respective operation buttons are arranged to allow selection of the file format types of PDF, JPEG (Joint Photographic Experts Group), and TIFF (Tagged Image File Format).

Referring to FIG. 8 again, control proceeds to step S31 to determine whether there is a scan mode selection input. For example, determination can made of a scan mode selection input in the case where the resolution and format type are selected at the scan mode selection screen set forth above, followed by depression of the start key button.

A scanning process is initiated when there is a scan mode selection input (step S32). In contrast, when there is no scan mode selection input at step S31, the state of step S31 is maintained.

Then, the process of displaying a currently scanning screen is executed (step S33).

A currently scanning screen on operation display screen 115 according to the first embodiment of the present invention will be described with reference to FIG. 10.

Figure 10:
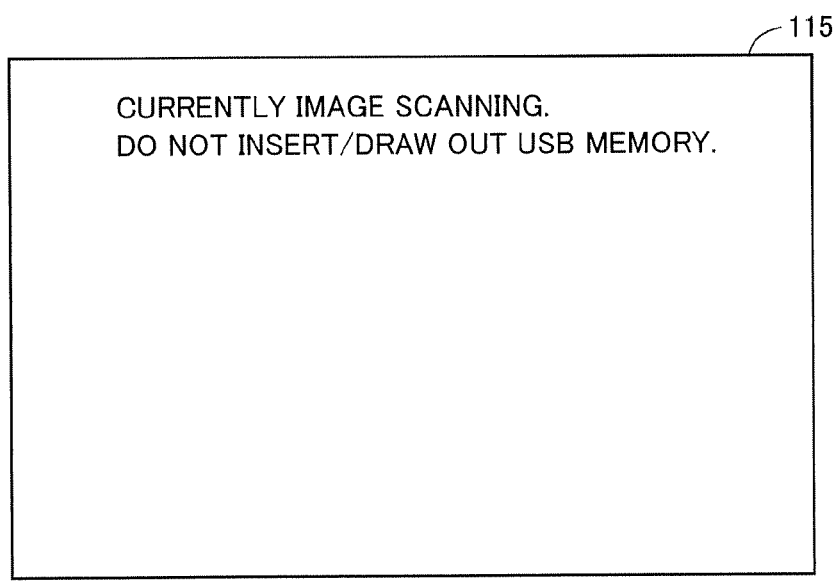
FIG. 10 is a diagram to describe a currently scanning screen on an operation display screen according to the first embodiment of the present invention.

Referring to FIG. 10, the message of "Currently image scanning. Do not insert/draw out USB memory." on operation display screen 115 is executed. By virtue of this display process, the user is warned that drawing out a USB memory or loading a new USB memory is prohibited until the process ends to suppress any erroneous operation on the USB memory.

Referring to FIG. 8 again, control proceeds to step S34 to end the scanning process.

Then, control proceeds to step S35 to determine whether USB memory job acceptance is permitted or not. When in a USB memory job acceptance permitted state at step S35, control proceeds to step S36 to execute a USB memory write process. Then, the process ends.

When not in a USB memory job acceptance permitted state at step S35, control proceeds to step S37 to execute a write process to a hard disk drive (HDD).

For example, if the user loads a new USB memory during a scanning process, there is a possibility of not being able to determine which of the USB memories the scanned image data is to be written since a state is achieved in which a plurality of USB memories are loaded. Therefore, when determination is made that a plurality of USB memories are loaded, the scheme to temporarily store the image data at the HDD is adopted. In response to designation of rewriting that will be described afterwards, the stored image data is output from the HDD to be used for executing a writing process to a USB memory. Thus, degradation in the working efficiency such as carrying out a scanning process again can be suppressed.

Then, determination is made whether USB memory job acceptance is permitted or not (step S39).

When in a USB memory job acceptance permitted state at step S39, a USB memory rewrite selection screen display process is executed (step S40).

When not in a USB memory job acceptance permitted state at step S39, control proceeds to step S38 to execute a USB memory plural loading prohibition display process set forth above.

When determination is made that USB memory job acceptance is not permitted at step S39, i.e. a plurality of USB memories are loaded and in a USB memory job acceptance prohibited state, the aforementioned USB memory plural loading prohibition display screen will be displayed continuously.

Therefore, the user can be warned by this display screen and is prompted to confirm loading of a USB memory. The user can set the loading to one USB memory, whereby the USB memory job acceptance prohibited state is rendered to a USB memory job acceptance permitted state to allow transition from step S39 to step S40 in FIG. 8.

A rewrite selection screen of a USB memory according to the first embodiment of the present invention will be described with reference to FIG. 11.

Figure 11:
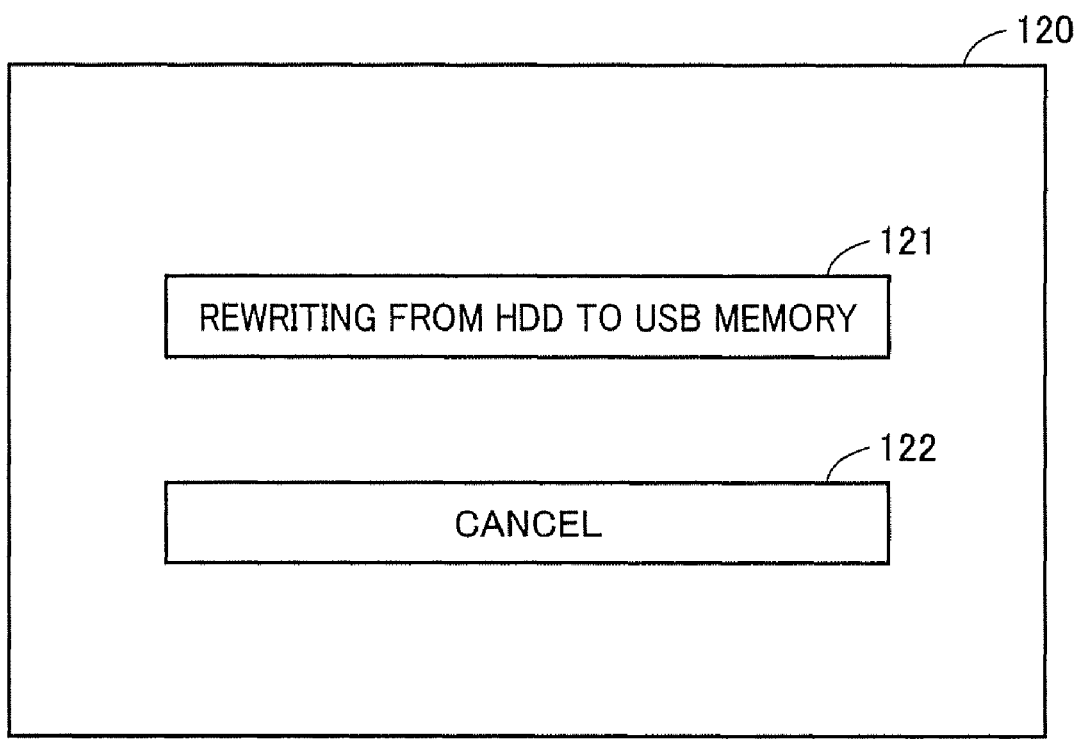
FIG. 11 is a diagram to describe a selection screen of rewriting for a USB memory according to the first embodiment of the present invention.

Referring to FIG. 11, an operation button 121 to designate selection of rewriting of a USB memory from the HDD, and a cancel button 122 are provided on operation display screen 120.

By depressing an operation button 121 designating selection of rewriting to a USB memory from the HDD in FIG. 11, execution of rewriting from the HDD to a USB memory can be executed.

Referring to FIG. 8 again, control proceeds to step S41 to determine whether there is rewriting selection designation. When determination is made of designation of rewriting selection at step S41, control proceeds to step S42 to execute a writing process into a USB memory. Then, the process ends.

In the case where rewriting is not selected, i.e. cancel button 122 is operated, a process to erase the image data stored in the hard disk drive is executed (step S43). Then, the process ends.

When a plurality of USB memories are loaded prior to execution of a USB memory scan process in the relevant USB memory scan process, execution of a USB memory scan process can be prohibited.

When a plurality of USB memories are loaded after initiating a scanning process during execution of the USB memory scan process, the scanned image data is temporarily stored in the HDD to be saved. Subsequently, when a state where only one USB memory is loaded is achieved, a write process is executed towards the relevant USB memory based on the saved image data. Thus, execution of a writing process to an improper USB memory, when a plurality of USB memories are loaded, can be prevented.

The writing of scanned document information into a USB memory not intended among a plurality of USB memories to cause leakage of information to a third party can be suppressed.

Figure 12:
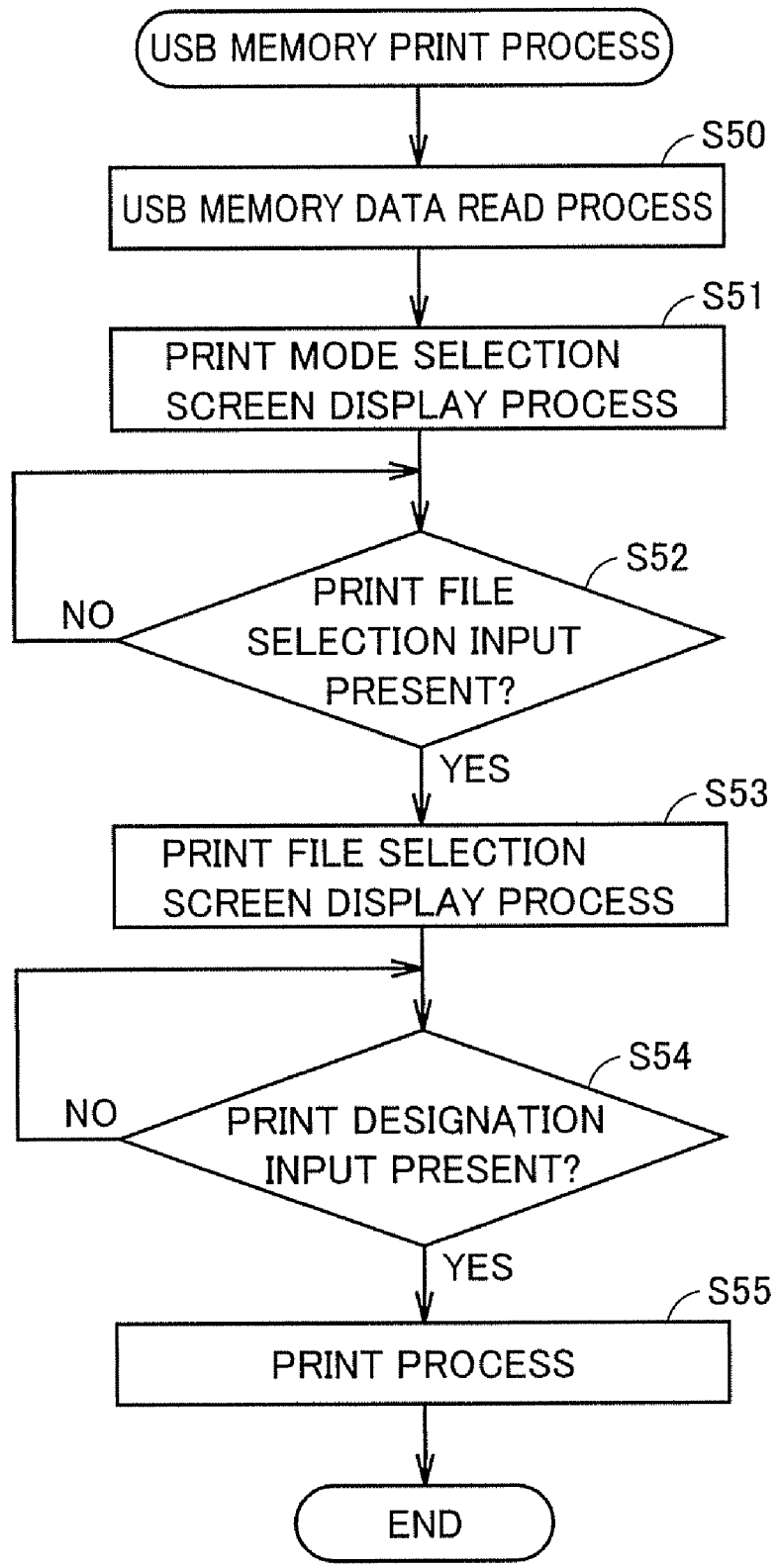
FIG. 12 is a flowchart to describe a USB memory print process according to the first embodiment of the present invention.

Execution of a USB memory print process at step S28 of FIG. 5 will be described with reference to the flowchart of FIG. 12.

First, the process of reading in data stored in a USB memory is executed (step S50).

Then, a process of displaying a print mode selection screen is executed (step S51).

A print mode selection screen according to the first embodiment of the present invention will be described with reference to FIG. 13.

Figure 13:
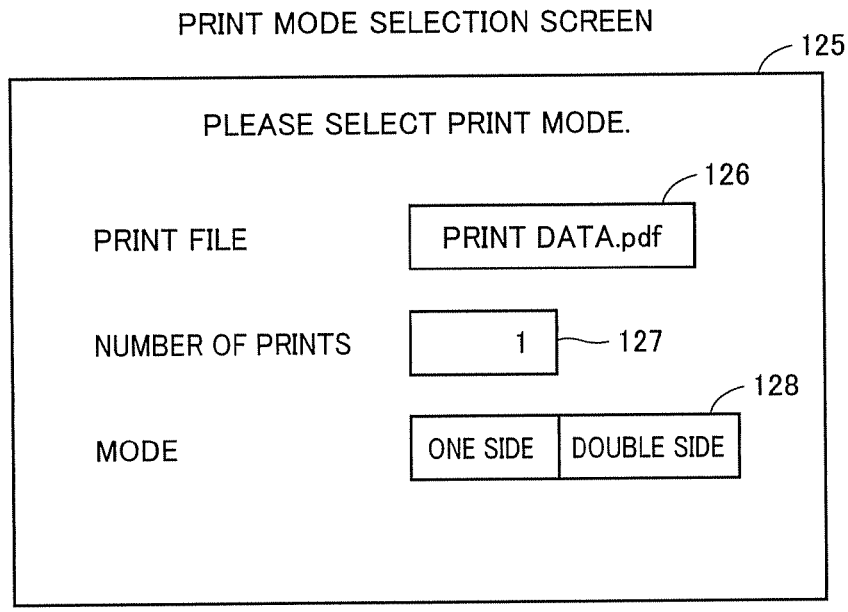
FIG. 13 is a diagram to describe a print mode selection screen according to the first embodiment of the present invention.

Referring to FIG. 13, the message of "Please select print mode." as well as operation buttons 126-128 for the print file, number of prints, and modes are provided on operation display screen 125.

By operating the buttons corresponding to the print file, number of prints, and mode, the user can designate the print file, number of prints, and the mode such as one side or double-side printing.

Then, determination is made whether a print file selection input has been made or not (step S52). When there is no print file selection input, the relevant state is maintained.

Specifically, when operation button 126 executing a print file selection input is designated at step S52, a process of displaying a print file selection screen is executed (step S53).

A selection screen of a print file according to the first embodiment of the present invention will be described with reference to FIG. 14.

Figure 14:
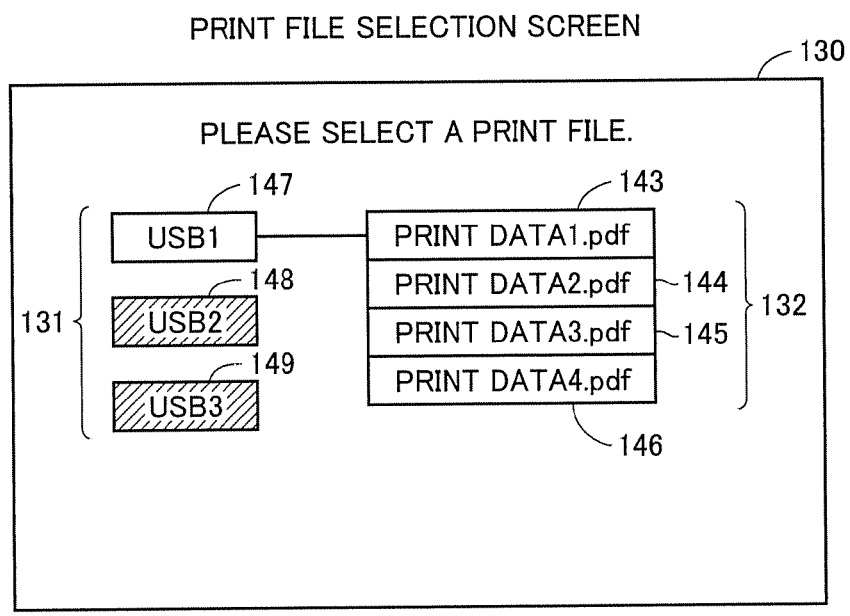
FIG. 14 is a diagram to describe a selection screen of a print file according to the first embodiment of the present invention.

Referring to FIG. 14, the message of "Please select a print file." as well as operation buttons 147-149 of USB1, USB2 and USB3, corresponding to USB connectors CN1-CN3, respectively, are displayed at display region 131 on operation display screen 130. In the first embodiment, it is assumed that operation buttons 148 and 149 corresponding to USB2 and USB3, respectively, are selection-disabled.

A list file of USB memories loaded at USB connectors corresponding to USB1, USB2 and USB3 is displayed at display region 132.

Print data 1.pdf to print data 4.pdf are shown as examples of data files stored in the connected USB memories, corresponding to selectable operation buttons 143 to 146, respectively.

In the display screen of the print files, it is assumed that the background color of operation buttons 147, 148 and 149 of USB1, USB2 and USB3, respectively, are displayed such that USB1 is differentiated from USB2 and USB3 on the print file display screen. Specifically, the background color of USB2 and USB3 are displayed in a highlighted manner, for example, with respect to USB1.

Such display of an operation display screen allows the user to confirm from which USB memory the print file will be output during his/her operation on the operation panel. Thus, the operation of selecting print data from a USB memory not intended due to an erroneous operation by the user can be prevented.

Referring to FIG. 12 again, determination is made whether there is a print designation input (step S54). When there is a print designation input based on input of a start key or the like at step S54, a print process is executed (step S55). Then, the process ends.

The present embodiment can prevent data from being written into an erroneous USB memory by prohibiting execution of a USB memory scan function and disallowing the user's operation when a plurality of USB memories are loaded. In addition, reading and printing of print data from an improper USB memory can be prohibited.

In a case where a plurality of USB memories are loaded during execution of USB memory scanning, image data is temporarily stored in the HDD. Subsequently, when a state where only one USB memory is loaded is achieved, i.e. when determination is made that there is no possibility of a process to be carried out on an improper USB memory, a rewrite process is executed towards the relevant USB memory based on the saved image data. Thus, the problem of information leakage as well as degradation in the working efficiency such as carrying out again scanning can be suppressed.

Second Embodiment

The first embodiment is based on the case where execution of USB memory printing/USB memory scanning or the like is ceased when a plurality of USB memories are loaded. It is also possible to execute the relevant USB memory printing/ USB memory scanning in the case where the user selects a certain USB memory from the plurality of USB memories.

The second embodiment is directed to the scheme of allowing continuation of the execution of USB memory printing/ USB memory scanning by designating a certain USB memory from a plurality of USB memories. The configuration of image formation apparatus 1 is similar to that described in the first embodiment. Therefore, details of the description thereof will not be repeated.

A USB memory access process according to a second embodiment of the present invention will be described with reference to FIG. 15.

Figure 15:
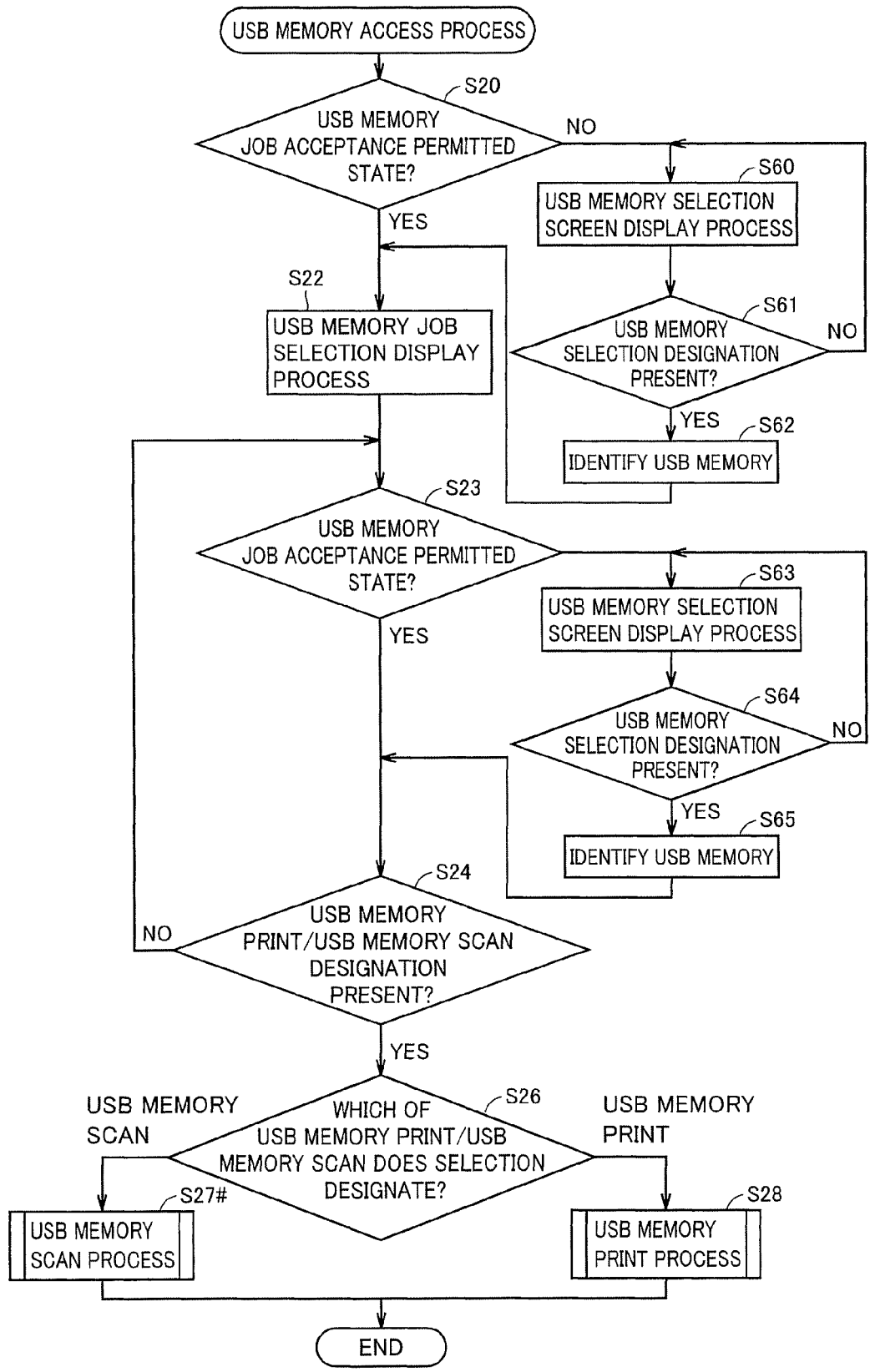
FIG. 15 is a flowchart to describe a USB memory access process according to a second embodiment of the present invention.

Referring to FIG. 15, the USB memory access process of the second embodiment differs from that of the first embodiment shown in FIG. 8 in that the USB memory plural loading prohibition display process of step S21 is substituted with steps S60-S62, and the USB memory plural loading prohibition display process of step S25 is substituted with steps S63-S65. Furthermore, the USB memory scan process of step S27 is substituted with the USB memory scan process of step S27#.

First, determination is made whether USB memory job acceptance is permitted or not, as set forth above (step S20). When determination is made of being in a USB memory job acceptance permitted state at step S20, control proceeds to step S22.

When determination is made of not being in a USB memory job acceptance permitted state at step S20, control proceeds to step S60 to execute a USB memory selection screen display process.

A USB memory selection screen according to the second embodiment of the present invention will be described with reference to FIG. 16.

Figure 16:
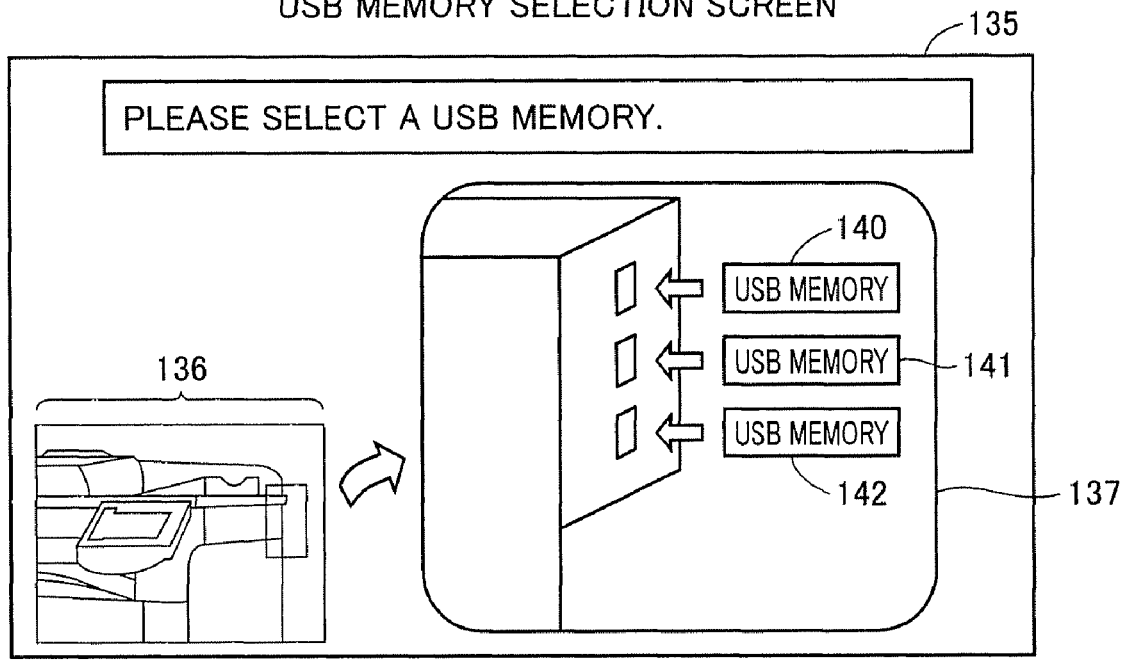
FIG. 16 is a diagram to describe a selection screen of a USB memory according to the second embodiment of the present invention.

Referring to FIG. 16, the message of "Please select a USB memory" as well as a portion of the entire appearance model of MFP 1 at a display region 136, emphasized in a rectangle to allow the user to confirm the arranged position of USB connectors, is displayed on operation display screen 135.

A further enlarged view of the configuration model at display region 136 for USB connectors is displayed in a rectangular region of display region 137.

In display region 137, operation buttons 140-142 that allows designation of any of the three USB memories are provided. Three USB connectors are shown as an example of a plurality of USB connectors. Operation buttons are shown to allow selection of respective connected USB memories corresponding to the upper, middle, and lower items.

Referring to FIG. 15 again, determination is made whether there is USB memory selection designation (step S61). When there is no selection designation, control returns to step S60.

When there is selection designation at step S61, control proceeds to step S62 to identify the designated USB memory. Specifically, a certain USB memory is identified and job control unit 50 is set to the USB memory job acceptance permitted state so as to carry out the job on the identified USB memory.

Then, control returns to step S22 where the above-described USB memory job selection display process is executed.

Then, determination is made whether USB memory job acceptance is permitted or not (step S23).

When determination is made of not being in the USB memory job acceptance permitted state, a USB memory selection screen display process is executed (step S63). Then, determination is made whether there is USB memory select designation or not (step S64). If there is no designation, control returns to step S63.

If there is designation, the USB memory is identified (step S65). Then, control proceeds to step S24. The processes of steps S63-S65 are similar to those described for steps S60-S62. Therefore, detailed description thereof will not be repeated.

Even when in a USB memory job acceptance permitted state at step S20 and a plurality of USB memories are loaded after execution of a USB memory job select display process (step S22), the USB memory selection screen display process and the like will be executed. Therefore, the user is provided with the display of the relevant display screen be prompted identification of a USB memory. In response, the user selects a USB memory to identify the USB memory for the job. Thus, a job can be executed on the identified USB memory.

The process of steps S24 and et seq. are similar to those described in FIG. 5, except for the USB memory scan process of step S27#. Therefore, detailed description thereof will not be repeated.

A USB memory scan process according to the second embodiment of the present invention will be described with reference to FIG. 17.

Figure 17:
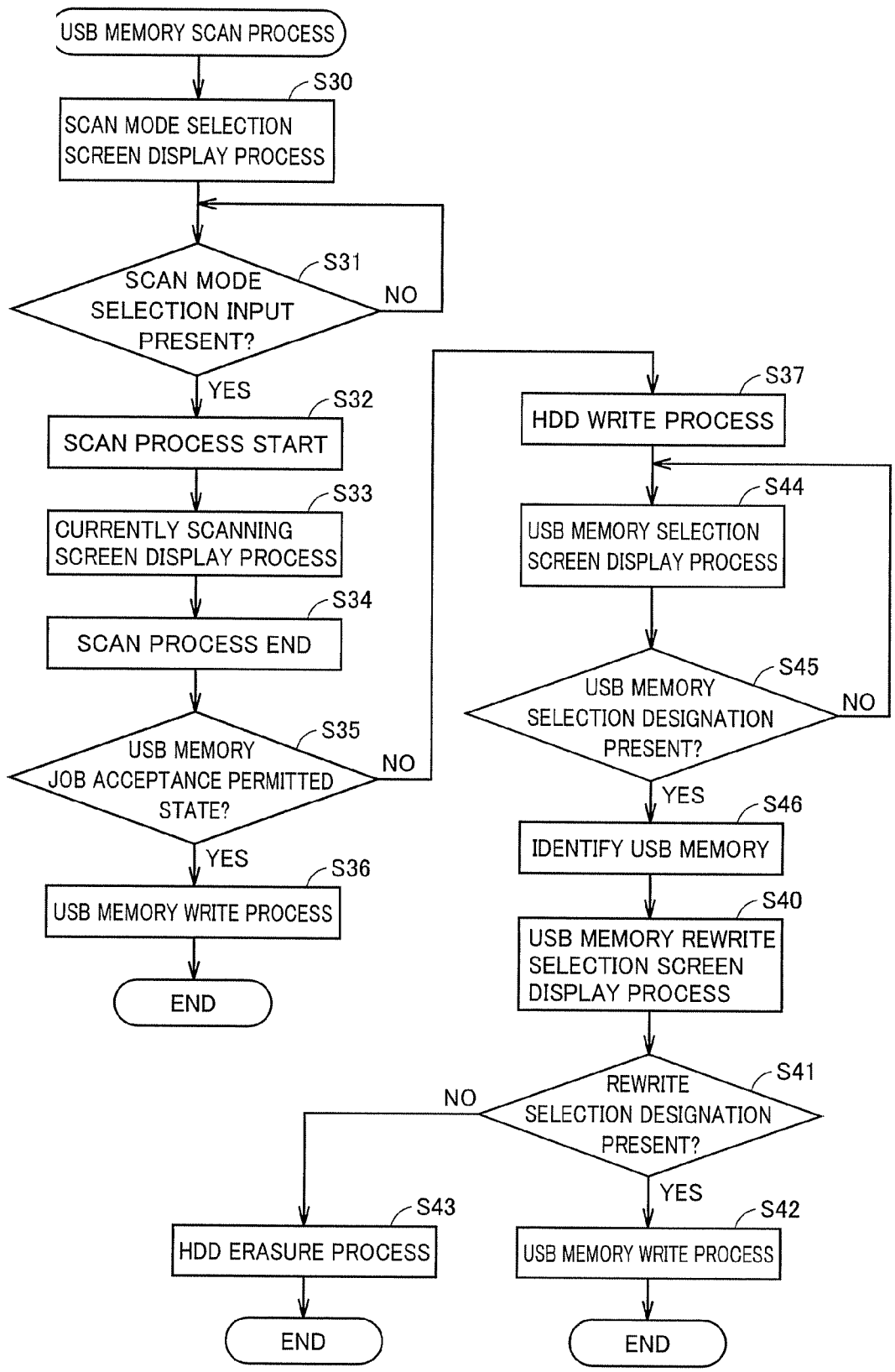
FIG. 17 is a flowchart of a USB memory scan process according to the second embodiment of the present invention.

Referring to FIG. 17, the USB memory scan process of the second embodiment differs from the USB memory scan process of the first embodiment corresponding to FIG. 8 in that steps S38 and S39 are substituted with steps S44-S46. The remaining steps are similar to those described above in the first embodiment, and detailed description thereof will not be repeated.

Determination is made whether USB memory job acceptance is permitted or not (step S35). When determination is made of being in the USB memory job acceptance permitted state at step S35, control proceeds to step S36 to execute a USB memory write process.

When determination is made of not being in a USB memory job acceptance permitted state at step S35, control proceeds to step S37 to execute a write process towards a hard disk drive (HDD).

For example, when the user loads a new USB memory during a scanning process, there is a possibility of not being able to determine to which USB memory the scanned image data is to be written since a plurality of USB memories are loaded. Therefore, when determination is made that a plurality of USB memories are loaded, the scheme to temporarily store the image data into the HDD is adopted. When a USB memory is identified and rewriting is designated, as will be described afterwards, the stored image data is output from the HDD to be written to the identified USB memory. Accordingly, reduction in the working efficiency such as carrying out the scanning process again can be suppressed.

Then, the USB memory selection screen display process described with reference to FIG. 16 is executed (step S44).

Determination is made whether selection of a USB memory is designated or not (step S45). When there is no selection designation, control returns to step S44.

When determination is made that there is selection designation at step S45, control proceeds to step S46 to identify the designated USB memory. Specifically, the USB memory is designated and the USB memory job acceptance permitted state is set, so that a job is executed on the identified USB memory.

Then, the above-described USB memory rewrite selection screen display process is executed (step S40). The subsequent processes are similar to those described with reference to FIG. 8. Therefore, detailed description thereof will not be repeated.

Furthermore, details of the USB memory print process will not be repeated since they are similar to those described in the first embodiment. When a plurality of USB memories are loaded, the print file selection screen described with reference to FIG. 14 can be set to display list files of USB memories loaded at respective USB connectors of USB1, USB2 and USB3 at display region 132 by operating buttons 147-149 corresponding to USB1, USB2, and USB3, respectively.

It is also possible to select a print file to be printed for designation according to the relevant display.

In the case where a plurality of USB memories are loaded according to the second embodiment, a USB memory selection screen display process is executed to allow the user to designate one USB memory from the plurality of USB memories to identify the USB memory for the job. Therefore, a predetermined job can be executed for the relevant USB memory. The erroneous operation of executing a job on an unintended memory can be prevented.

In a case where a plurality of USB memories are loaded after initiating a scanning process during execution of USB memory scanning, the scanned image data is temporarily stored in the HDD. Subsequently, by designating one USB memory from the plurality of USB memories and executing a write process towards the relevant USB memory based on the saved image data, execution of a write process on an improper USB memory can be prevented.

The writing of scanned document information into a USB memory not intended among a plurality of USB memories to cause leakage of information to a third party can be suppressed.

Third Embodiment

The previous second embodiment is based on a scheme of specifying, when a plurality of USB memories are loaded, a certain USB memory to execute a predetermined job, i.e. USB memory scanning or printing, with respect to the specified USB memory.

The third embodiment of the present invention is based on a scheme of improving the operability, when a plurality of USB memories are loaded, by allowing the user to readily recognize the specified USB memory among the plurality of USB memories. The procedure of specifying a certain USB memory when a plurality of USB memories are loaded is similar to that described in the second embodiment. Therefore, detailed description thereof will not be repeated.

Figure 18:
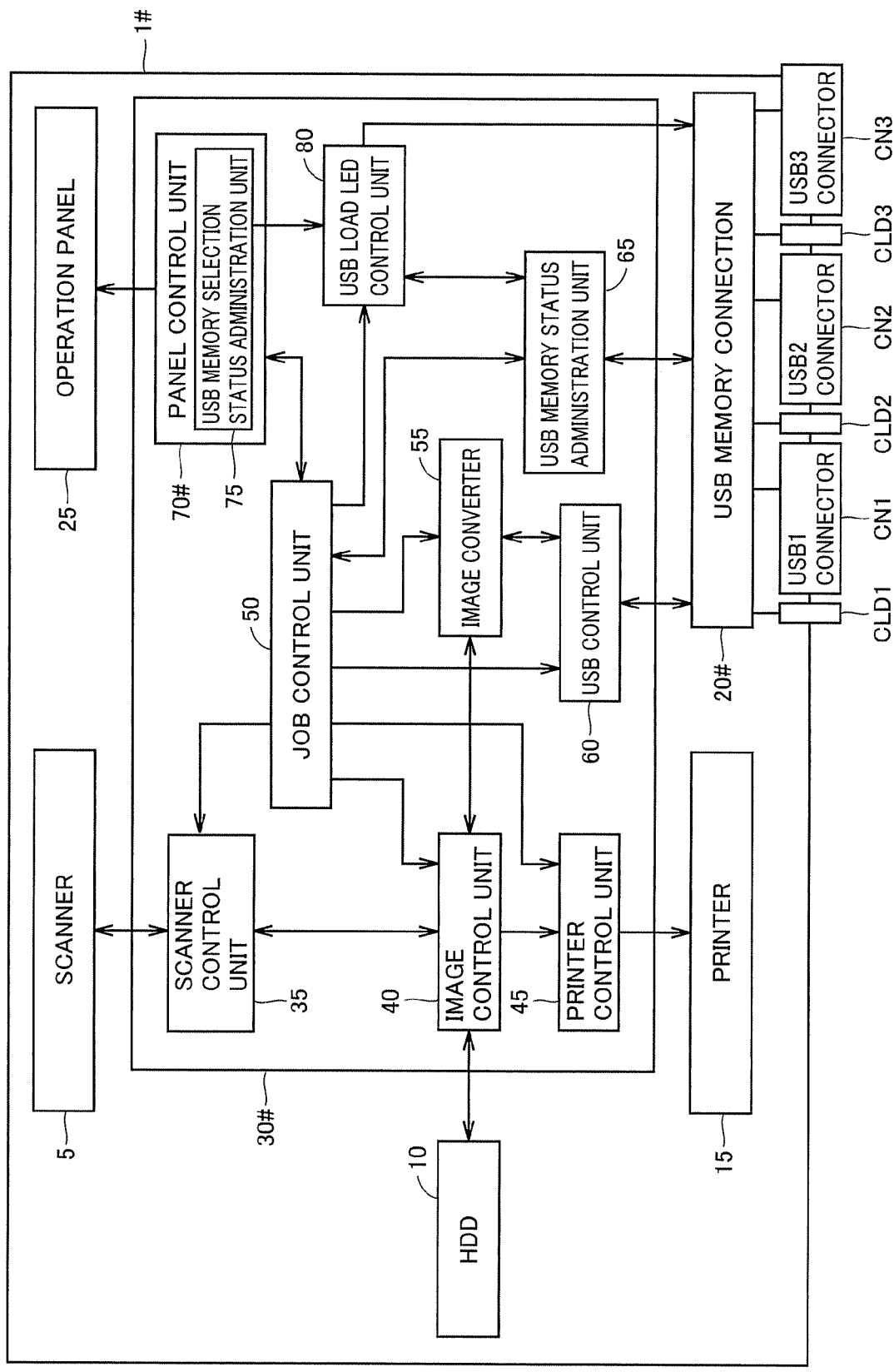
FIG. 18 is a schematic block diagram of an MFP according to a third embodiment of the present invention.

Referring to FIG. 18, an MFP 1# according to the third embodiment of the present invention differs from MFP 1 of FIG. 1 in that USB memory load LEDs CLDs-CLD3 are additionally provided corresponding to USB connectors CN1-CN3, respectively, a controller 30# is substituted for controller 30, and a USB memory connection 20# is substituted for USB memory connection 20.

Controller 30# differs from controller 30 in that a panel control unit 70# is substituted for panel control unit 70, and a USB load LED control unit 80 is additionally provided.

Panel control unit 70# further includes a USB memory select status administration unit 75.

USB memory select status administration unit 75 monitors the selected status of a USB memory on the operation panel, and notifies USB load LED control unit 80 of the status of the selected USB memory.

USB load LED control unit 80 executes the lighting control of USB memory load LEDs CLD1-CLD3 via USB memory connection 20# based on the information related to the USB memory load status from USB memory status administration unit 65 and information from USB memory select status administration unit 75 at panel control unit 70#.

Figure 19:
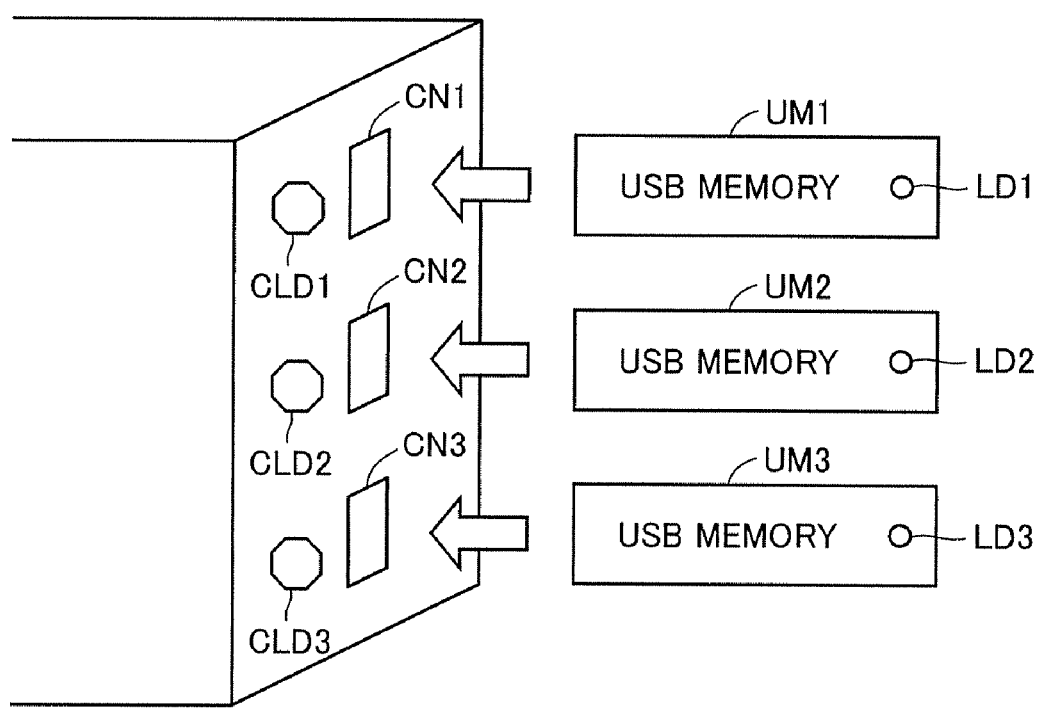
FIG. 19 is a schematic block diagram of a configuration to describe a USB memory load LED according to the third embodiment of the present invention.

Referring to FIG. 19, MFP 1# according to the third embodiment of the present invention has USB memory load LEDs CLD1-CLD3 connected corresponding to USB connectors CN1-CN3, respectively. USB memories UM1-UM3 can be loaded at USB connectors CN1-CN3, respectively. USB memories UM1-UM3 include LEDs LD1-LD3, respectively.

A process of the USB memory load LED control unit according to the third embodiment of the present invention will be described with reference to FIG. 20. It is assumed that this process is executed periodically at a predetermined timing for each of USB memory load LEDs CLD1-CLD3.

Figure 20:
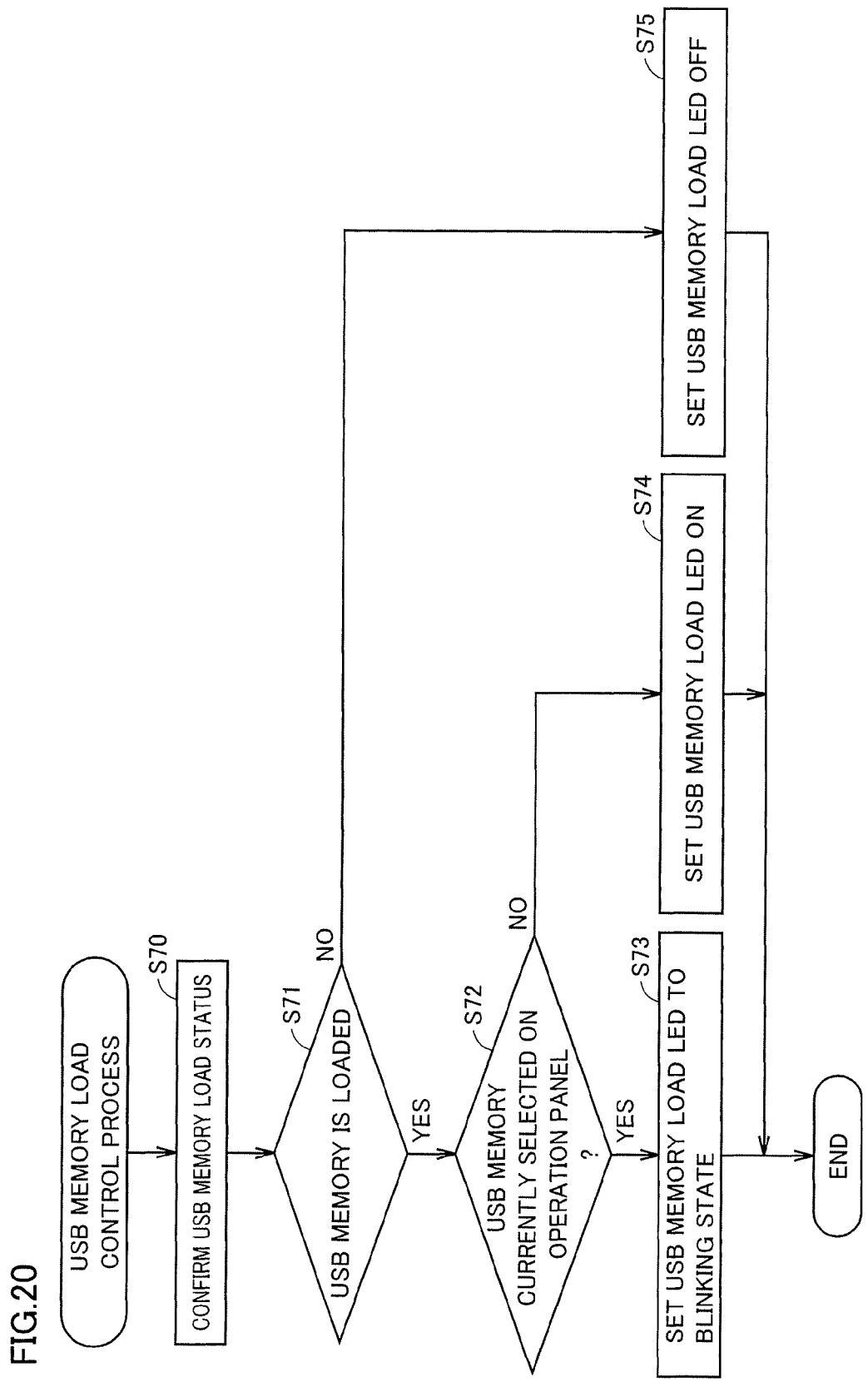
FIG. 20 is a flowchart to describe a process of a USB memory load LED (Light Emitting Diode) control unit according to the third embodiment of the present invention.

Referring to FIG. 20, first the USB memory load status is confirmed (step S70).

Then, determination is made whether a USB memory is loaded or not (step S71). Specifically, the USB memory load status is confirmed based on the information related to the USB memory load status from USB memory status administration unit 65.

When determination is made that a USB memory is loaded at step S71, control proceeds to step S72.

When determination is made than a USB memory is not loaded at step S71, the USB load LED is turned off (step S75). Then, the process ends.

Determination is made whether the USB memory is currently selected on the operation panel (step S72). Specifically, determination is made based on the information of the USB memory selected status on the operation panel from USB memory select status administration unit 75.

When determination is made that the USB memory is currently selected on the operation panel at step S72, the USB memory load LED is set to blink (step S73). Then, the process ends.

When determination is made that the USB memory is not currently selected on the operation panel at step S72, the USB memory load LED is turned on (step S74). Then, the process ends.

The corresponding USB load LED attains a blinking state when the USB memory identified by the control process is selected on the operation panel Accordingly, the user can be made aware of the blinking USB load LED during operation to readily confirm whether his/her selected USB memory is the intended USB memory or not to prevent an erroneous operation. The operability in selecting a USB memory on the operation panel can be improved.

Modification of Third Embodiment

The third embodiment set forth above is based on a scheme of improving the user's operability to prevent an erroneous operation by the additional provision of USB load LEDs. The operability can be improved without having to provide the USB load LEDs.

Specifically, a similar operation can be realized by controlling the lighting of LEDs LD1-LD3 mounted on USB memories UM1-UM3, respectively.

An MFP 1a according to a modification of the third embodiment will be described with reference to FIG. 21.

Figure 21:
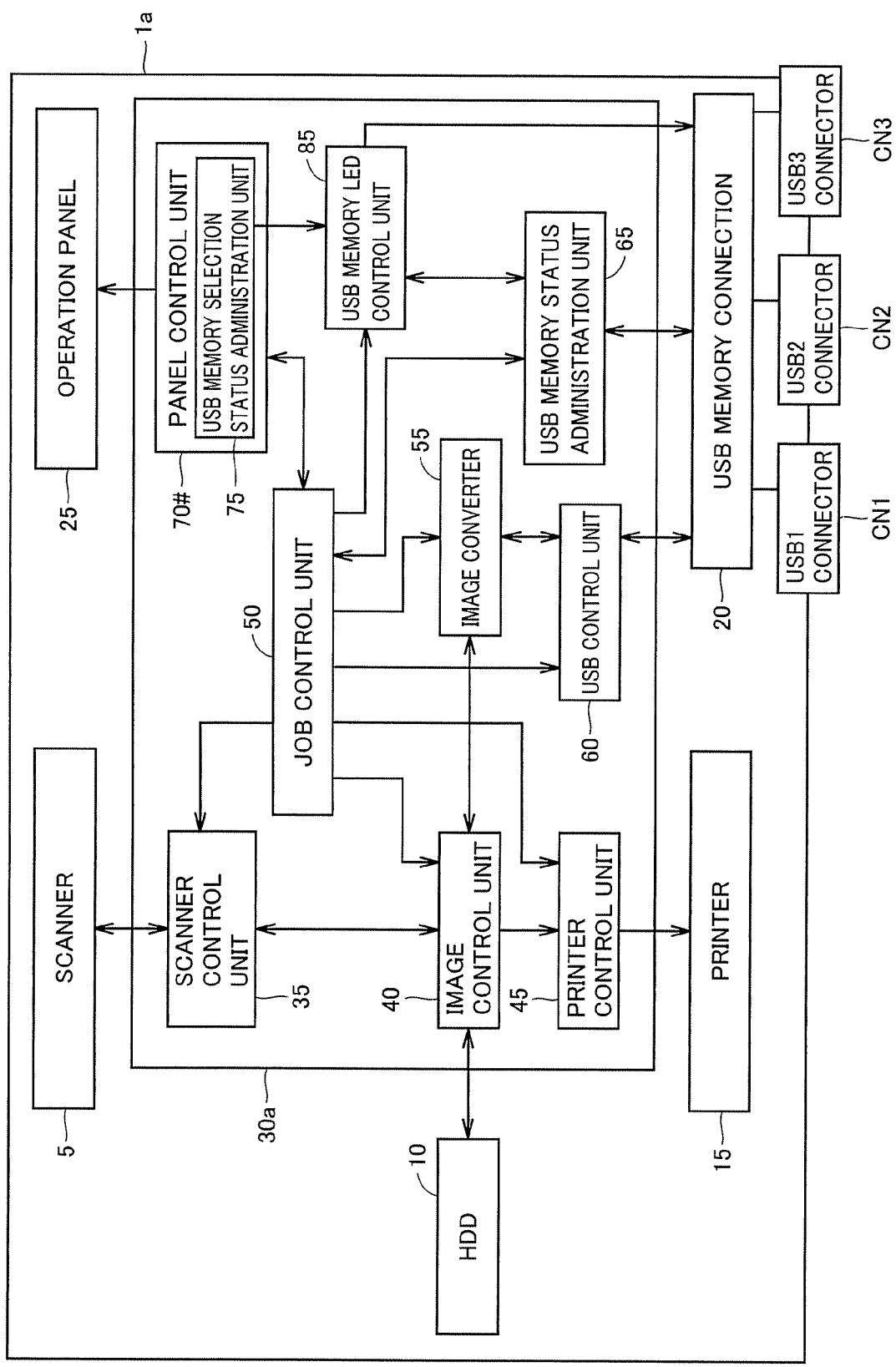
FIG. 21 is a schematic block diagram of an MFP according to a modification of the third embodiment of the present invention.

Referring to FIG. 21, MFP 1a of the third embodiment differs from MFP 1# of FIG. 18 in that a USB memory LED control unit 85 is substituted for USB load LED control unit 80, USB memory load LEDs CLD1-CLD3 are deleted, and a USB memory connection 20 is substituted for USB memory connection 20#.

The process of the USB memory LED control unit according to a modification of the third embodiment will be described with reference to FIG. 22. It is assumed that this process is executed periodically at a predetermined timing.

Referring to FIG. 22, it is assumed that this process is executed when USB memories UM1-UM3 are loaded.

First, the USB memory load status is confirmed (step S80).

Then, determination is made whether a USB memory is loaded or not (step S81). Specifically, the USB memory load status is confirmed based on the information related to the USB memory load status from USB memory status administration unit 65.

When determination is made that a USB memory is loaded at step S81, control proceeds to step S82.

When determination is made that a USB memory is not loaded at step S81, the LED of the USB memory is turned off (step S85). Then, the process ends.

Determination is made whether the USB memory is currently selected on the operation panel at step S80 (step S82). Specifically, this determination is made based on the information of the USB memory selected status on the operation panel from USB memory select status administration unit 75.

When determination is made that the USB memory is currently selected on the operation panel at step S82, the LED of the USB memory is set to blink (step S83). Then, the process ends.

When the USB memory is not currently selected on the operation panel at step S82, the LED of the USB memory is turned on (step S84). Then, the process ends.

Since the LED of the USB memory identified at the control process attains a blinking state when the corresponding USB memory is selected on the operation panel, the user can be made aware of the blinking LED of the USB memory during operation to readily confirm whether his/her selected USB memory is the intended USB memory or not to prevent an erroneous operation. The operability in selecting a USB memory on the operation panel can be improved. Furthermore, a USB load LED does not have to be provided additionally. By virtue of light-emitting control of the LED of a USB memory that is already provided, it is not necessary to take into account the layout problem. It is further advantageous from the standpoint of cost.

The image formation apparatus of the present invention is not limited to an MFP, and may be a printer, a facsimile, or the like, as long as the device can form an image. The controller for control of the image formation apparatus can be provided in the form of a program by operating a computer to execute the control described with reference to the flow charts set forth above. Such a program can be stored in a computer-readable recording medium such as a flexible disk, CD-ROM (Compact disk-Read Only Memory), ROM (Read Only Memory), RAM (Random Access Memory) or memory card associated with a computer to be provided as a program product. Alternatively, the program can be recorded in a recording medium such as a hard disk incorporated in a computer to be provided as a program. Furthermore, the program can be provided by downloading through a network.

The program of the present invention may be configured to call the required module, in a predetermined sequence at a predetermined timing, among the program modules presented as a part of the operation system (OS) of the computer for execution of a process. In this case, the program per se does not include the aforementioned module, and the process is executed in cooperation with the OS. The program of the present invention may include such a program without a module.

Further, the program of the present invention may be incorporated into a part of another program to be presented. Similarly in this case, the program per se does not include the module present in the aforementioned other program, and a process is executed in cooperation with the other program. The program of the present invention may include such a program incorporated in the other program.

The presented program product is installed at a program storage such as a hard disk to be executed. The program product includes the program per se, and a recording medium in which the program is recorded.

Although the present invention has been described based on a USB memory as an example of a detachable storage device, the device is not particularly limited to a USB memory. The present invention is applicable to other auxiliary storage devices such as an SD card.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus comprising:
    a plurality of connectors allowing loading of detachable storage devices,
    a reader for reading out electronic data stored in detachable storage devices,
    a detector for detecting connection status between a connector and a detachable storage device,
    a printer printing out said electronic data read out by said reader, and
    wherein operation of said reader to read out electronic data from any one of said connected detachable storage devices is not permitted to begin when said detector detects a plurality of detachable storage devices connected to said plurality of connectors, and
    printing out of said electronic data read out by said reader is prohibited when connection of a plurality of detachable storage devices at said plurality of connectors is detected.

2. The image formation apparatus according to claim 1, wherein each said connector includes a lighting turned on in response to designation,
    said image formation apparatus further comprising:
    an operation unit having an operation screen, and
    a lighting control unit controlling said lighting, wherein
        when said plurality of detachable storage devices are connected at said plurality of connectors, a selection screen prompting selection of any one of said plurality of detachable storage devices is displayed on said operation screen,
        when selection of any one of said plurality of detachable storage devices is executed at said selection screen on said operation screen, said light control unit sets the lighting of a corresponding detachable storage device in a blinking manner.

3. The image formation apparatus according to claim 2, wherein, when any one of said plurality of detachable storage devices is selected at said selection screen on said operation screen, the selected detachable storage device is identified and access to the identified detachable storage device is executed.

4. An image formation apparatus comprising:
    a plurality of connectors allowing loading of detachable storage devices,
    a writer writing electronic data into a detachable storage device when the detachable storage device is connected at said connector,
    a detector detecting connection status between a connector and a detachable storage device and,
    a printer printing out said electronic data,
    wherein a writing operation of said electronic data to any one of said detachable storage devices is not permitted to begin when said detector detects a connection of a plurality of detachable storage devices at said plurality of connectors, and
    printing out of said electronic data is prohibited when connection of a plurality of detachable storage devices at said plurality of connectors is detected.

5. The image formation apparatus according to claim 4, wherein each said connector includes a lighting turned on in response to designation,
    said image formation apparatus further comprising:
    an operation unit having an operation screen, and
    a lighting control unit controlling said lighting, wherein
        when said plurality of detachable storage devices are connected at said plurality of connectors, a selection screen prompting selection of any one of said plurality of detachable storage devices is displayed on said operation screen,
        when selection of any one of said plurality of detachable storage devices is executed at said selection screen on said operation screen, said light control unit sets the lighting of a corresponding detachable storage device in a blinking manner.

6. The image formation apparatus according to claim 5, wherein, when any one of said plurality of detachable storage devices is selected at said selection screen on said operation screen, the selected detachable storage device is identified and access to the identified detachable storage device is executed.

7. The image formation apparatus according to claim 1, further comprising:
    an operation unit having an operation screen,
    wherein a job selection screen, prompting selection of print processing of said electronic data, is displayed on said operation screen upon said reader reading said electronic data of a detachable storage device.

8. The image formation apparatus according to claim 7, wherein each said connector includes a lighting turned on in response to designation,
    said image formation apparatus further comprising:
    a lighting control unit controlling said lighting, wherein
        when said plurality of detachable storage devices are connected at said plurality of connectors, a selection screen prompting said selection of any one of said plurality of detachable storage devices is displayed on said operation screen, and
        when selection of any one of said plurality of detachable storage devices is executed at said selection screen on said operation screen, said light control unit sets the lighting of a corresponding detachable storage device in a blinking manner.

9. The image formation apparatus according to claim 1, further comprising an operation unit including an operation screen,
    wherein a model representing an appearance of said plurality of connectors is displayed, and a selection screen prompting selection of any one of said plurality of detachable storage devices connectors is displayed, at said operation screen.

10. The image formation apparatus according to claim 1, further comprising an operation unit including an operation screen,
    wherein lists of document files stored in said plurality of detachable storage devices are displayed, and a selection screen prompting selection of any one of said plurality of detachable storage devices is displayed, on said operation screen.

11. The image formation apparatus according to claim 1, further comprising an operation unit including an operation screen,
    wherein, when connection of a new detachable storage device is detected during access of one detachable storage device, a display process of prompting unloading of said new detachable storage device is executed on the operation screen.

12. The image formation apparatus according to claim 1, wherein
an operation unit having an operation screen is provided at a front side of said image formation apparatus,
a control board for control of said image formation apparatus is provided at a rear side, opposite to the front side of said image formation apparatus,
said plurality of connectors are provided in proximity to said control board provided at the rear side.

13. A control method for an image formation apparatus including a plurality of connectors allowing loading of detachable storage devices and a reader for reading out electronic data stored in detachable storage devices, said method comprising the steps of:
detecting connection status between a connector and a detachable storage device,
prohibiting said reader from initiating a reading process of reading out electronic data stored in a detachable storage device when connection of a plurality of detachable storage devices at said plurality of connectors is detected at said detecting step, and
prohibiting printing of said electronic data read out by said reader when, subsequent to said reading out of said electronic data by said reader, connection of a plurality of detachable storage devices at said plurality of connectors is detected.

14. A control method for an image formation apparatus including a plurality of connectors allowing loading of detachable storage devices and a writer writing electronic data into a detachable storage device when a detachable storage device is connected at said connector, said method comprising the steps of:
detecting connection status between a connector and a detachable storage device;
prohibiting said writer from initiating writing of electronic data to a detachable storage device when connection of a plurality of detachable storage devices at said plurality of connectors is detected at said detecting step, and
prohibiting printing of said electronic data when connection of a plurality of detachable storage devices at said plurality of connectors is detected.

15. The control method for an image formation apparatus according to claim 13, wherein upon said reader reading electronic data stored in a detachable storage device out from said detachable storage device, said control method further comprising the step of:
displaying a job selection screen on an operation screen prompting selection of print processing of said electronic data read out from said detachable storage device.

* * * * *

UNITED STATES PATENT AND TRADEMARK OFFICE
CERTIFICATE OF CORRECTION

PATENT NO. : 8,135,875 B2
APPLICATION NO. : 12/131658
DATED : March 13, 2012
INVENTOR(S) : Hiroyasu Ito et al.

Page 1 of 1

It is certified that error appears in the above-identified patent and that said Letters Patent is hereby corrected as shown below:

On the title page, item [56] under "Other Publications" as follows:
Correct "Hewlett-Pacakrd Company, "hp photosamrt 1000" user's guide; 2000; pp. 21-26 and 87-90" to --Hewlett Packard Company "hp photosmart 1000" user's guide; 2000; pp. 21-26 and 87-89--; and correct "Hewlett Packard Comapny "hp psc 2500 photosmart series all-in-one" reference guide; 2003; pp. 21-34" to --Hewlett Packard Company "hp psc 2500 photosmart series all-in-one" reference guide; 2003; pp. 21-34--.

Claim 4, in column 17 of the patent, as follows:
Line 55 in column 17, replace "the detachable storage device" with --a detachable storage device--; and
Line 56 in column 17, replace "said connector" with --a connector--.

Claim 14, in column 20 of the patent, as follows:
Line 8 in column 20, replace "said connector" with --a connector--.

Signed and Sealed this
Sixth Day of November, 2012

David J. Kappos
*Director of the United States Patent and Trademark Office*